W. S. SOUTHWICK.
ROTARY WELDING MACHINE.
APPLICATION FILED APR. 22, 1918.
1,367,212.
Patented Feb. 1, 1921.
20 SHEETS—SHEET 8.
Fig. 13.
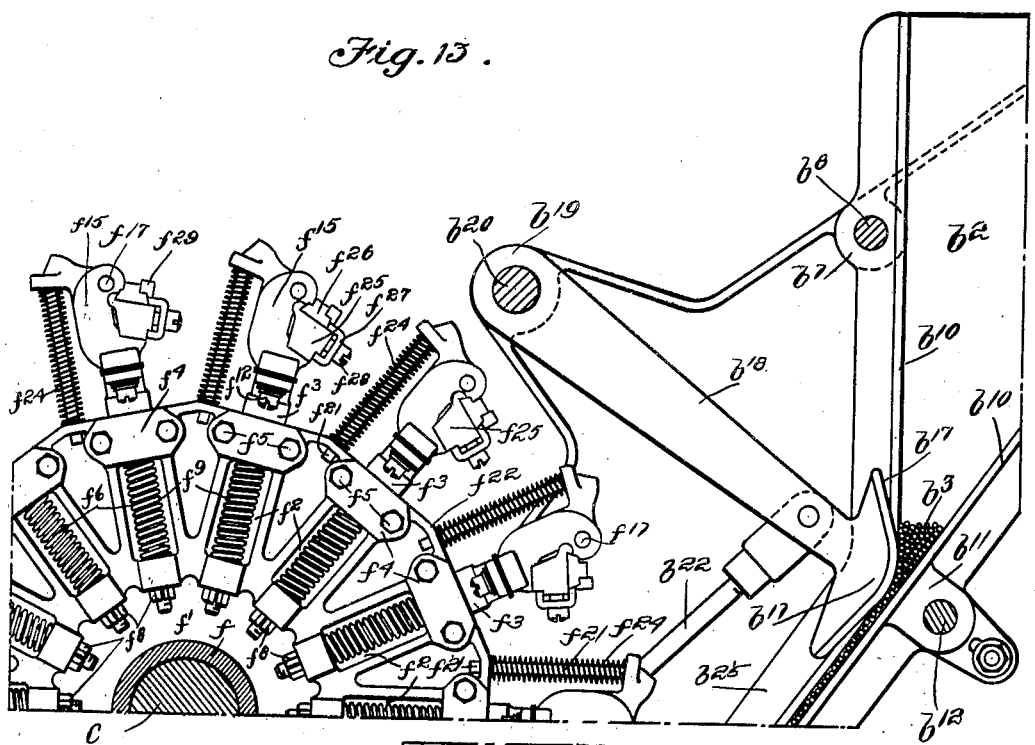
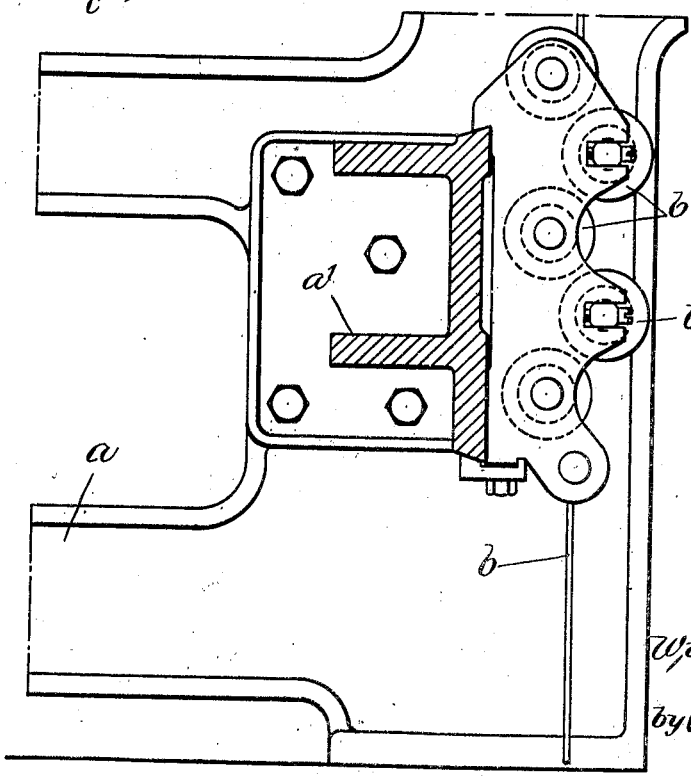
Fig. 14.
Inventor.
William S. Southwick
by Wright Brown Quinby & May
Attys.

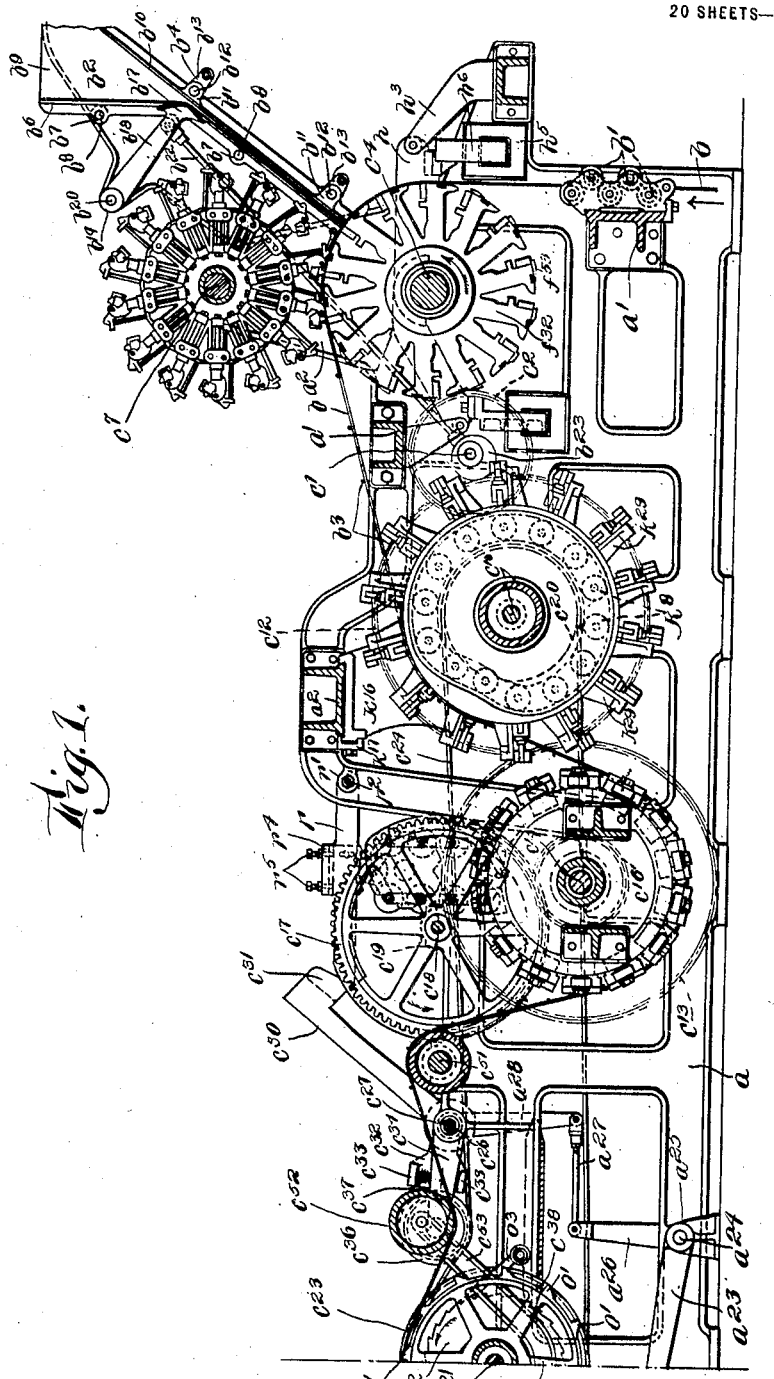

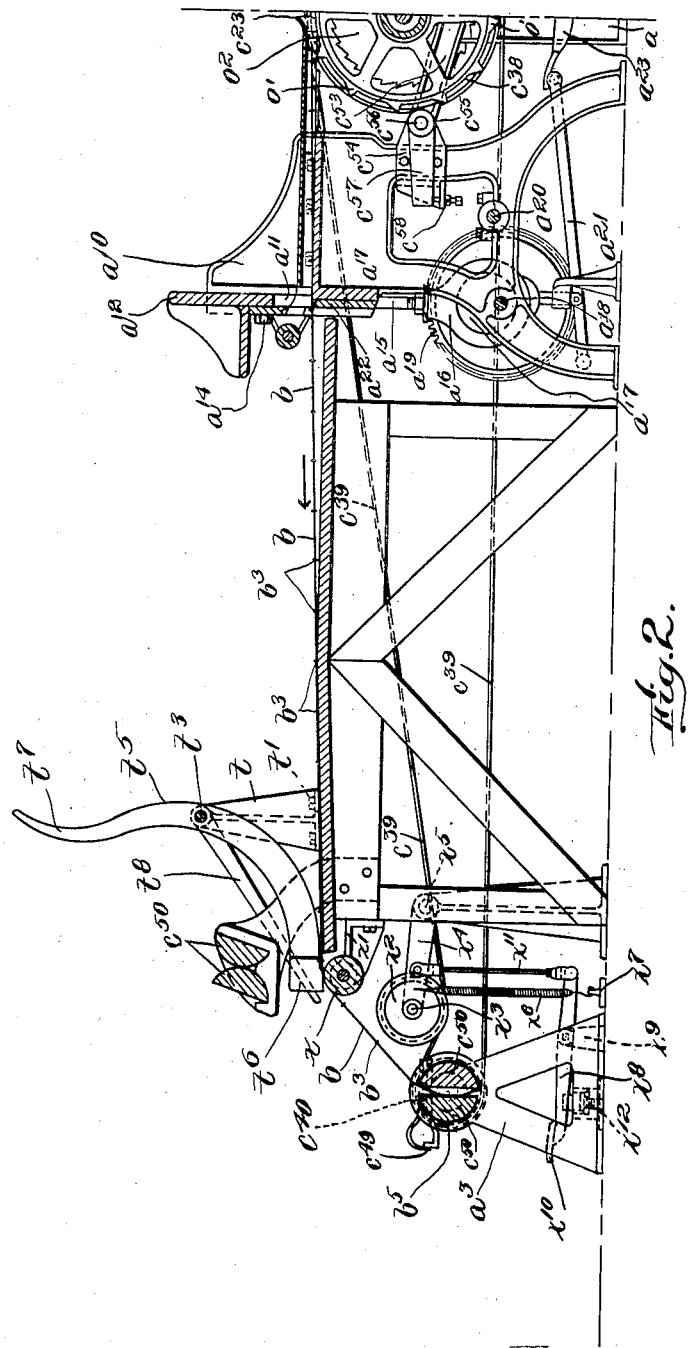

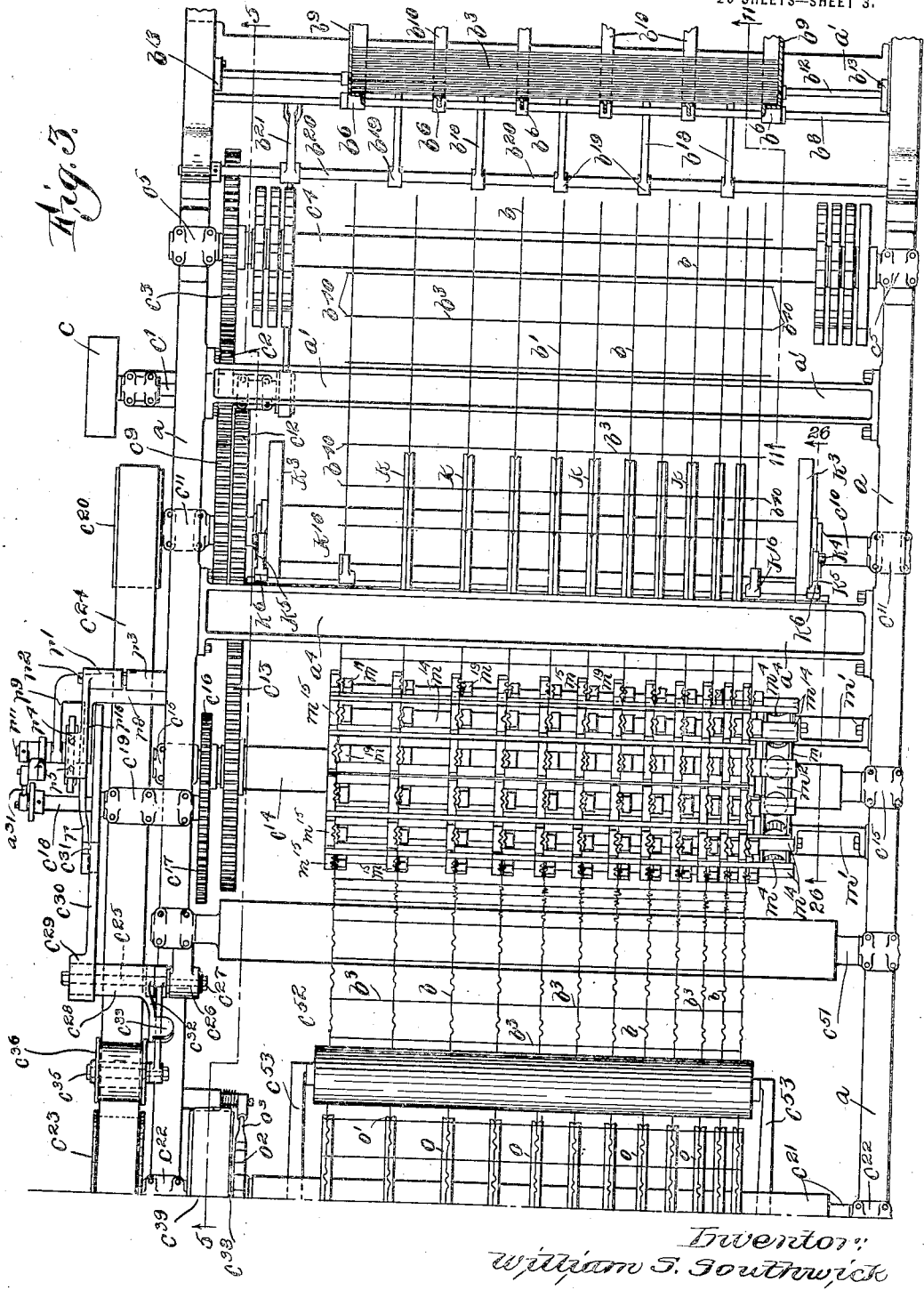

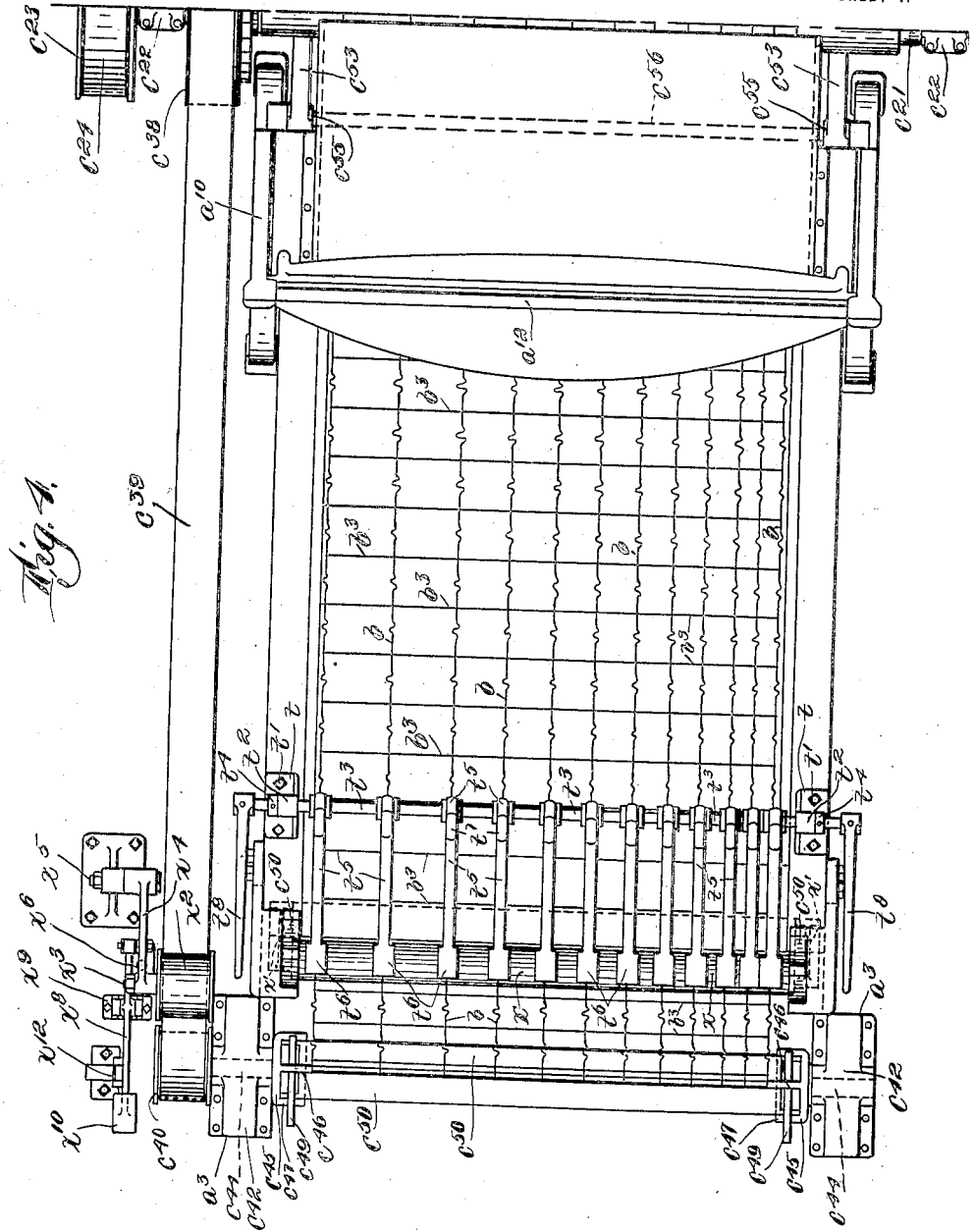

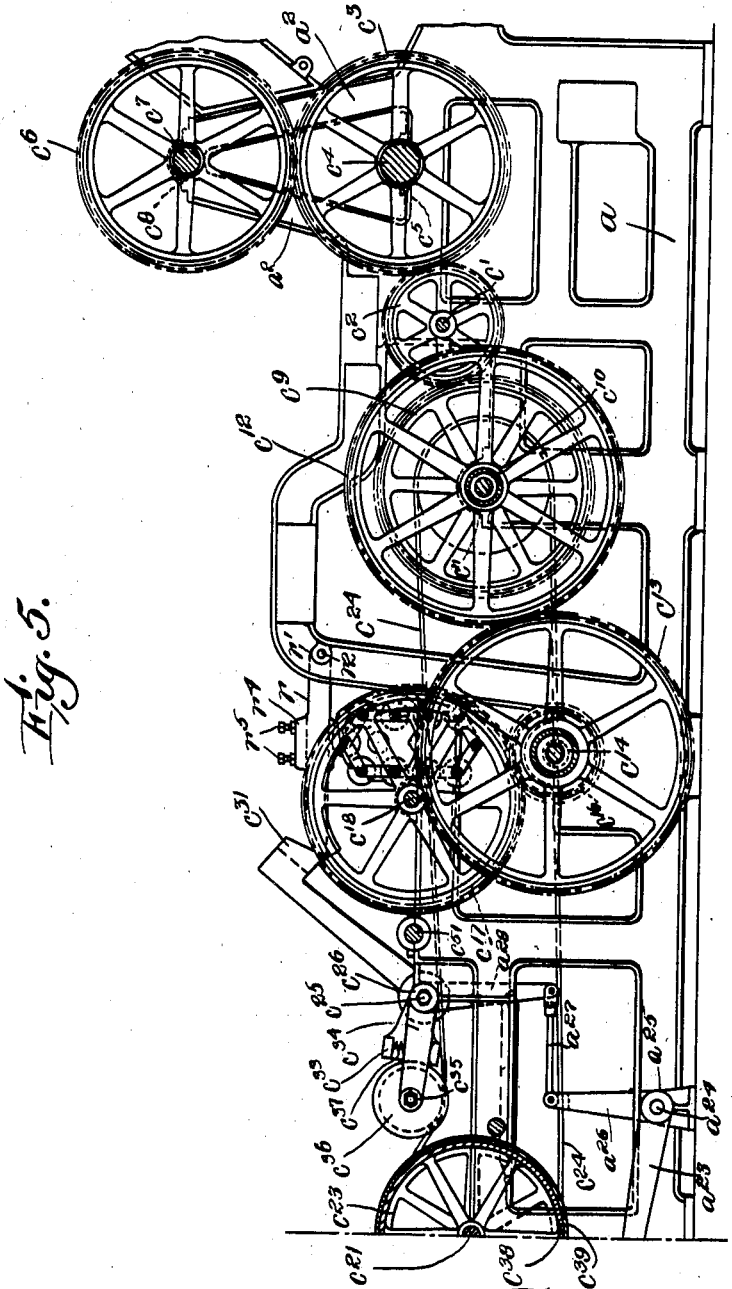

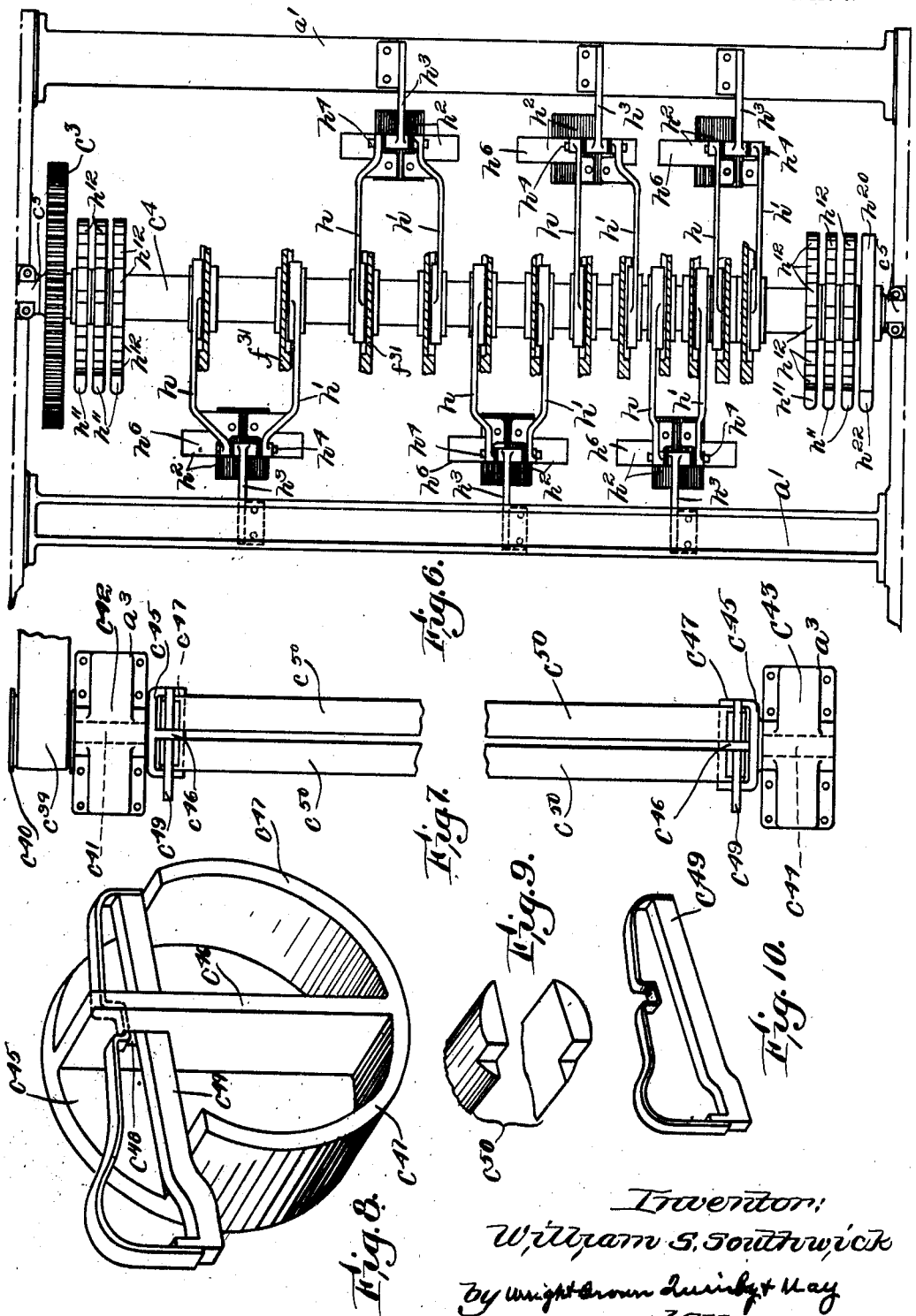

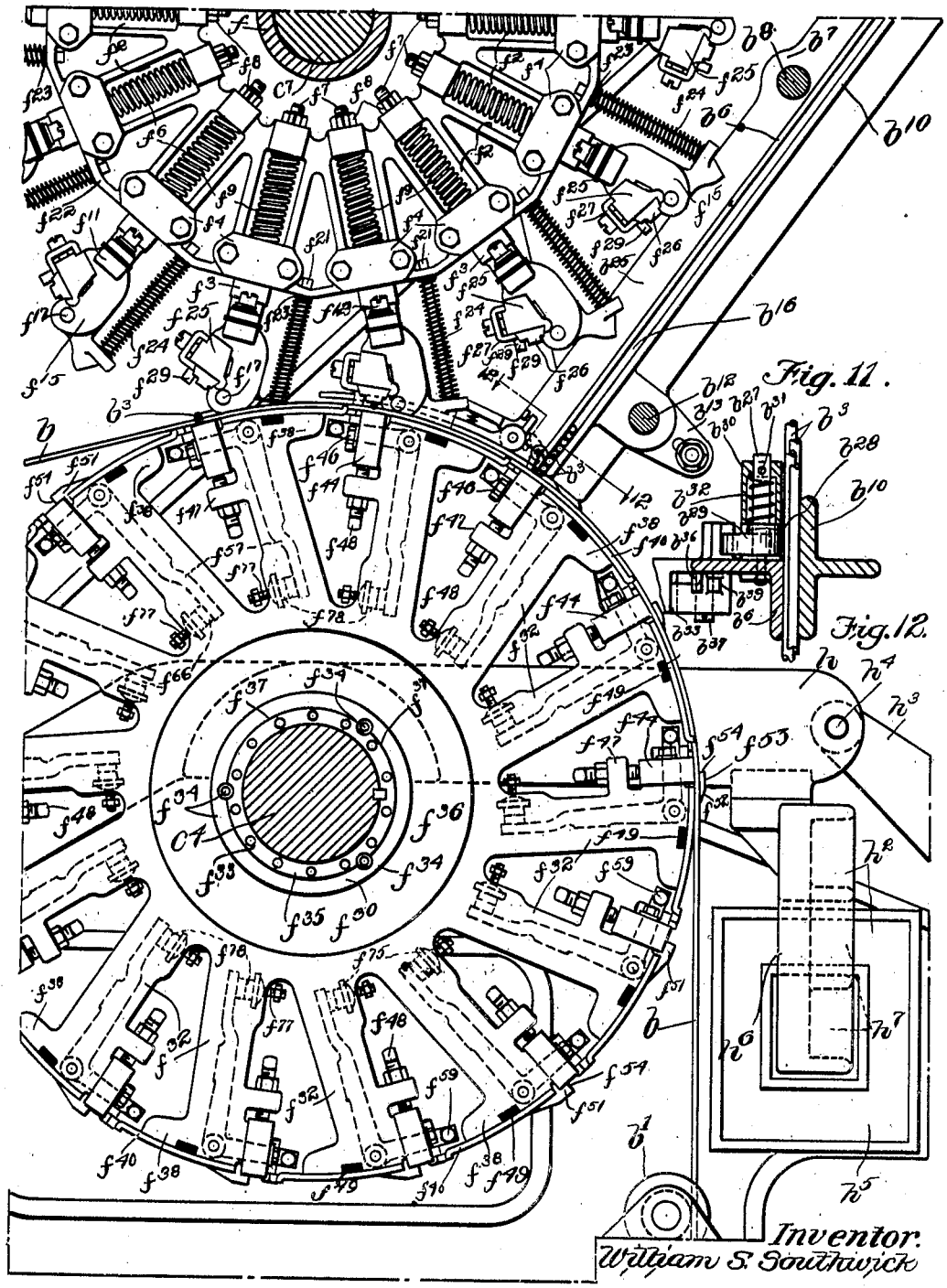

W. S. SOUTHWICK.
ROTARY WELDING MACHINE.
APPLICATION FILED APR. 22, 1918.
1,367,212.
Patented Feb. 1, 1921.
20 SHEETS—SHEET 9.
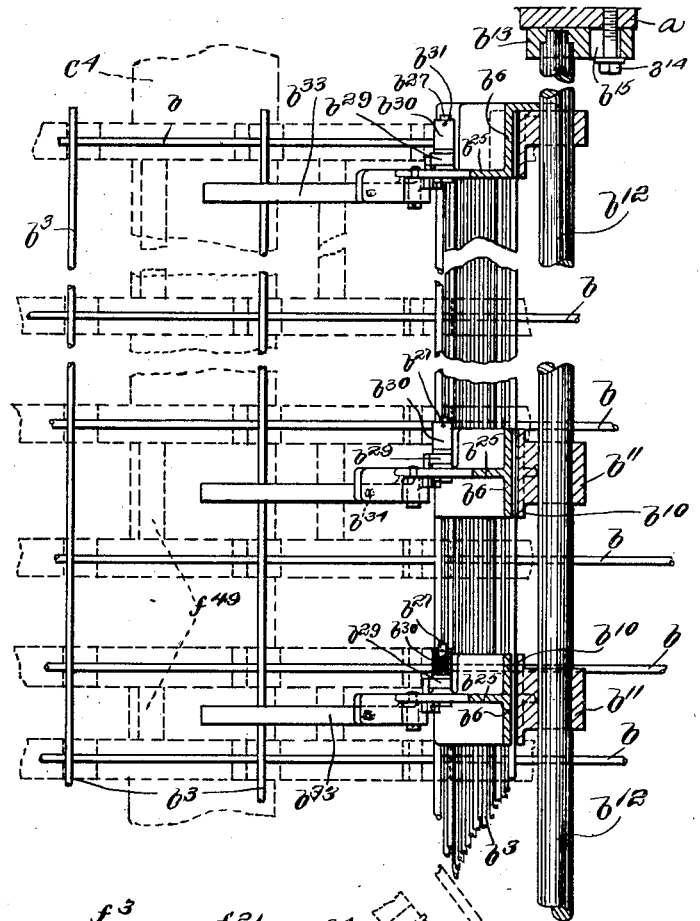
Fig. 16.
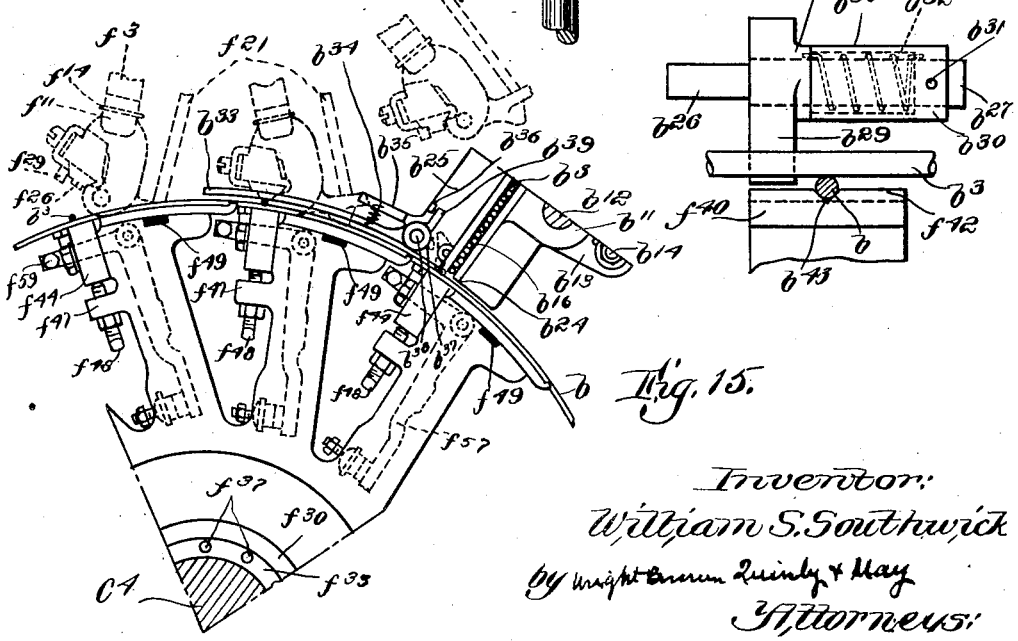
Fig. 17.
Fig. 15.
Inventor:
William S. Southwick
By Wright Brown Quinby & May
Attorneys

W. S. SOUTHWICK.
ROTARY WELDING MACHINE.
APPLICATION FILED APR. 22, 1918.

1,367,212.

Patented Feb. 1, 1921.
20 SHEETS—SHEET 10.

Inventor:
William S. Southwick
by Wright Brown Quinby & May
Attorneys.

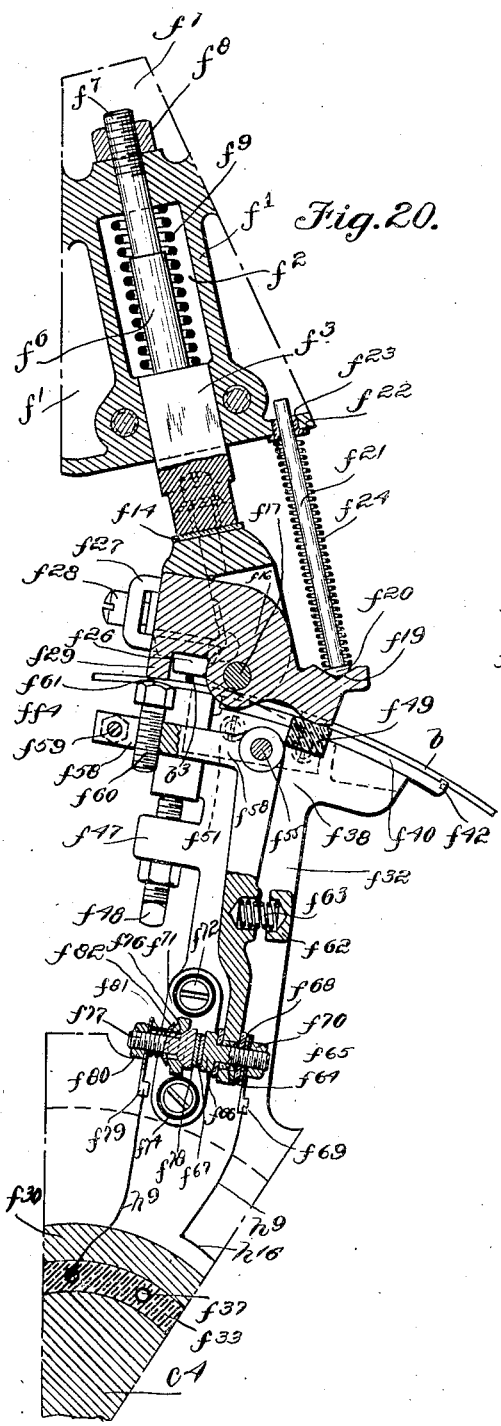

W. S. SOUTHWICK.
ROTARY WELDING MACHINE.
APPLICATION FILED APR. 22, 1918.
1,367,212.
Patented Feb. 1, 1921.
20 SHEETS—SHEET 12.
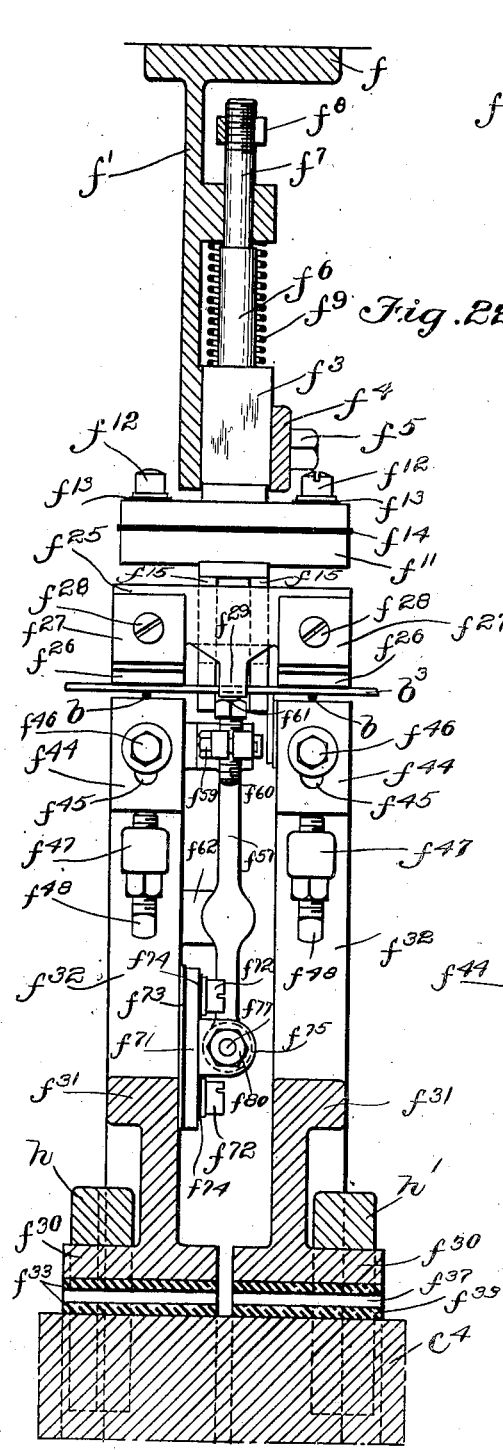
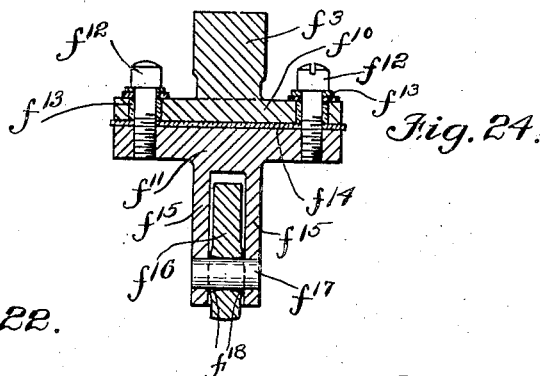
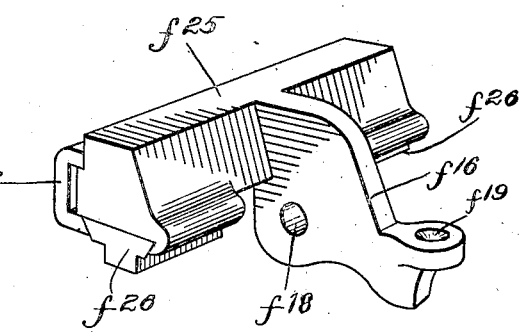
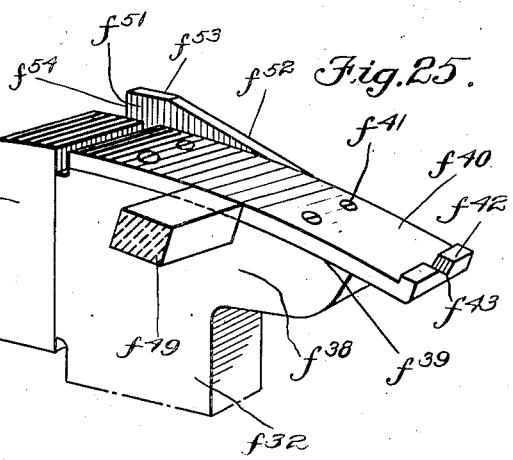
Inventor:
William S. Southwick
by Wright Brown Quinby & May
Att'ys.

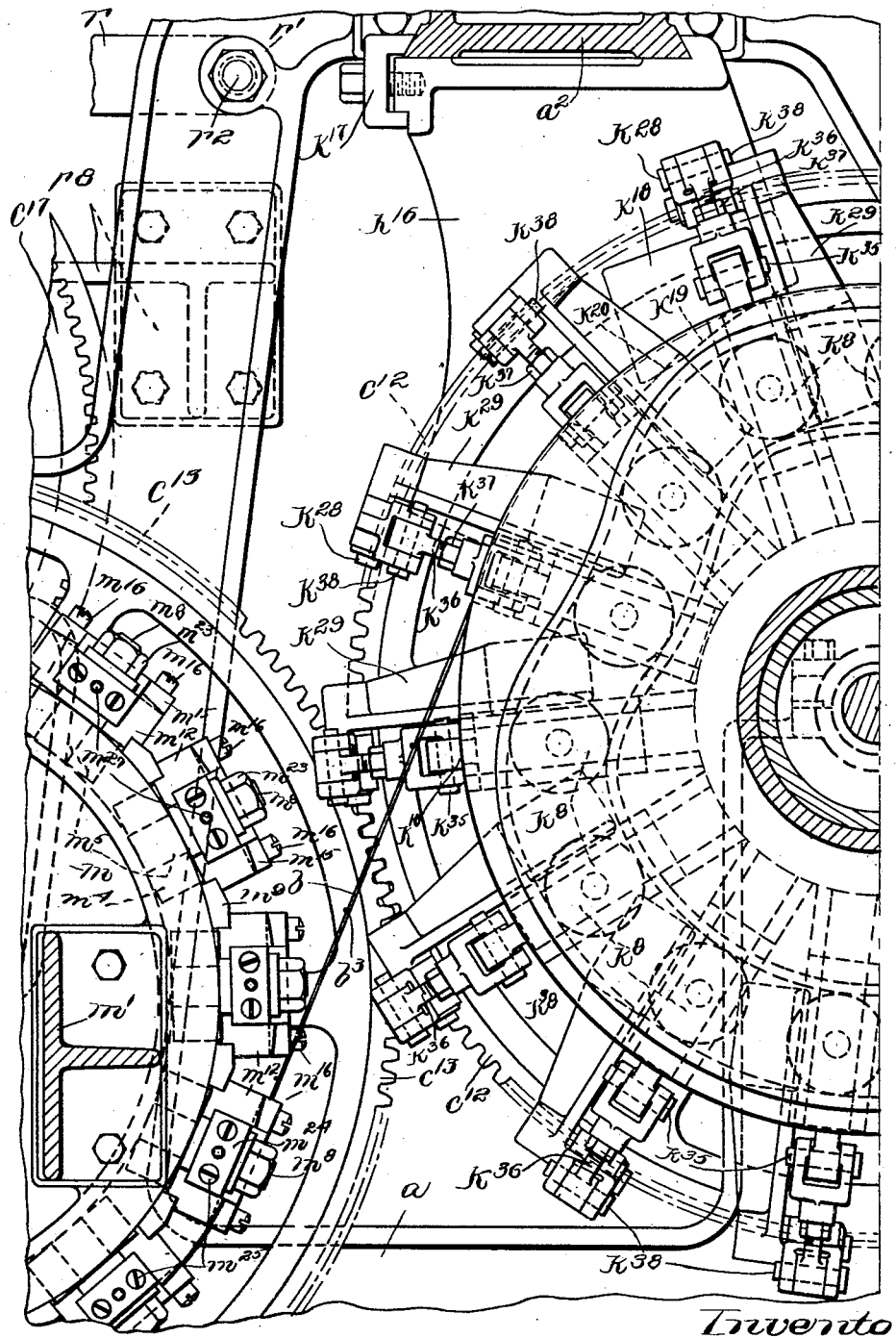

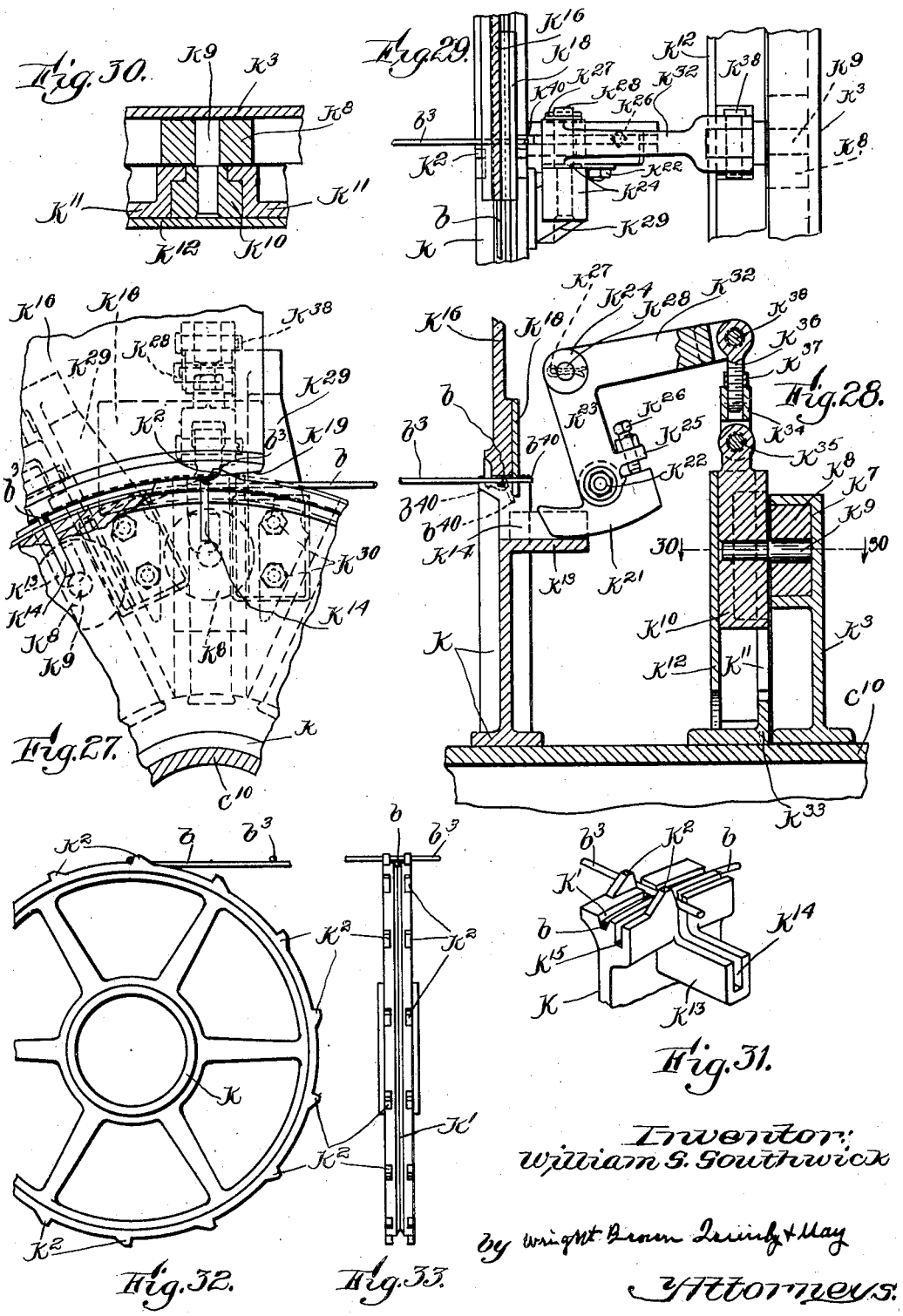

W. S. SOUTHWICK.
ROTARY WELDING MACHINE.
APPLICATION FILED APR. 22, 1918.
1,367,212.
Patented Feb. 1, 1921.
20 SHEETS—SHEET 15.
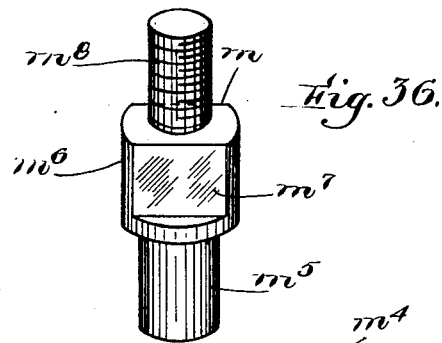
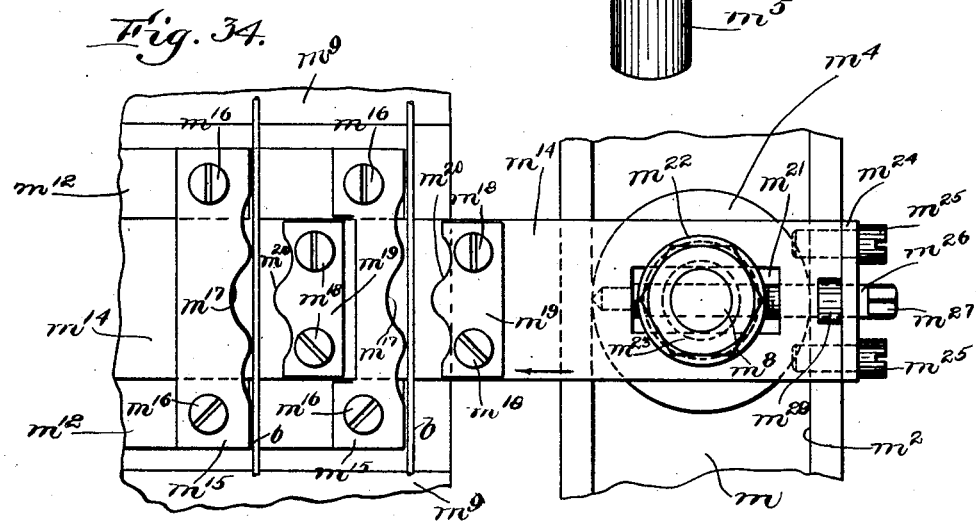
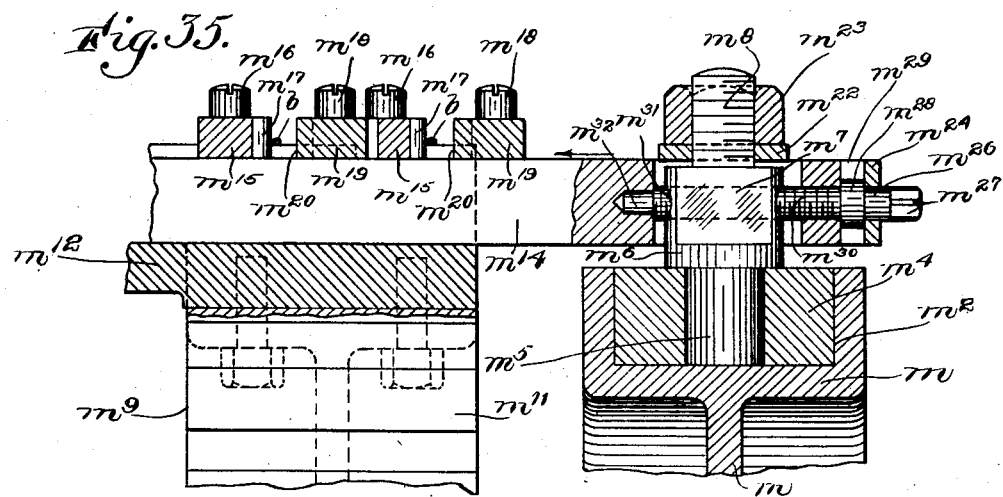
Inventor:
William S. Southwick
by Wright Brown Quinby & May
Attorneys

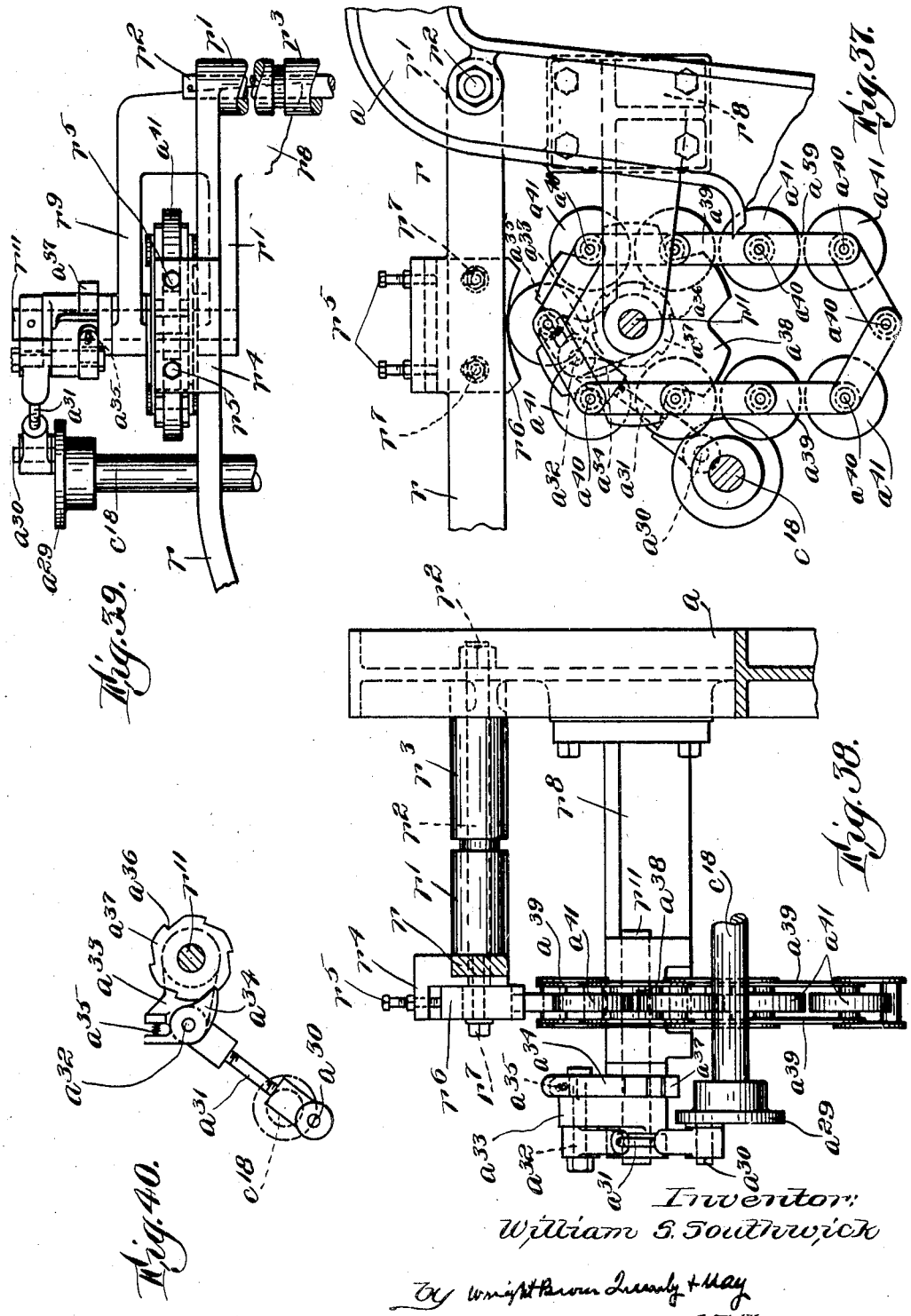

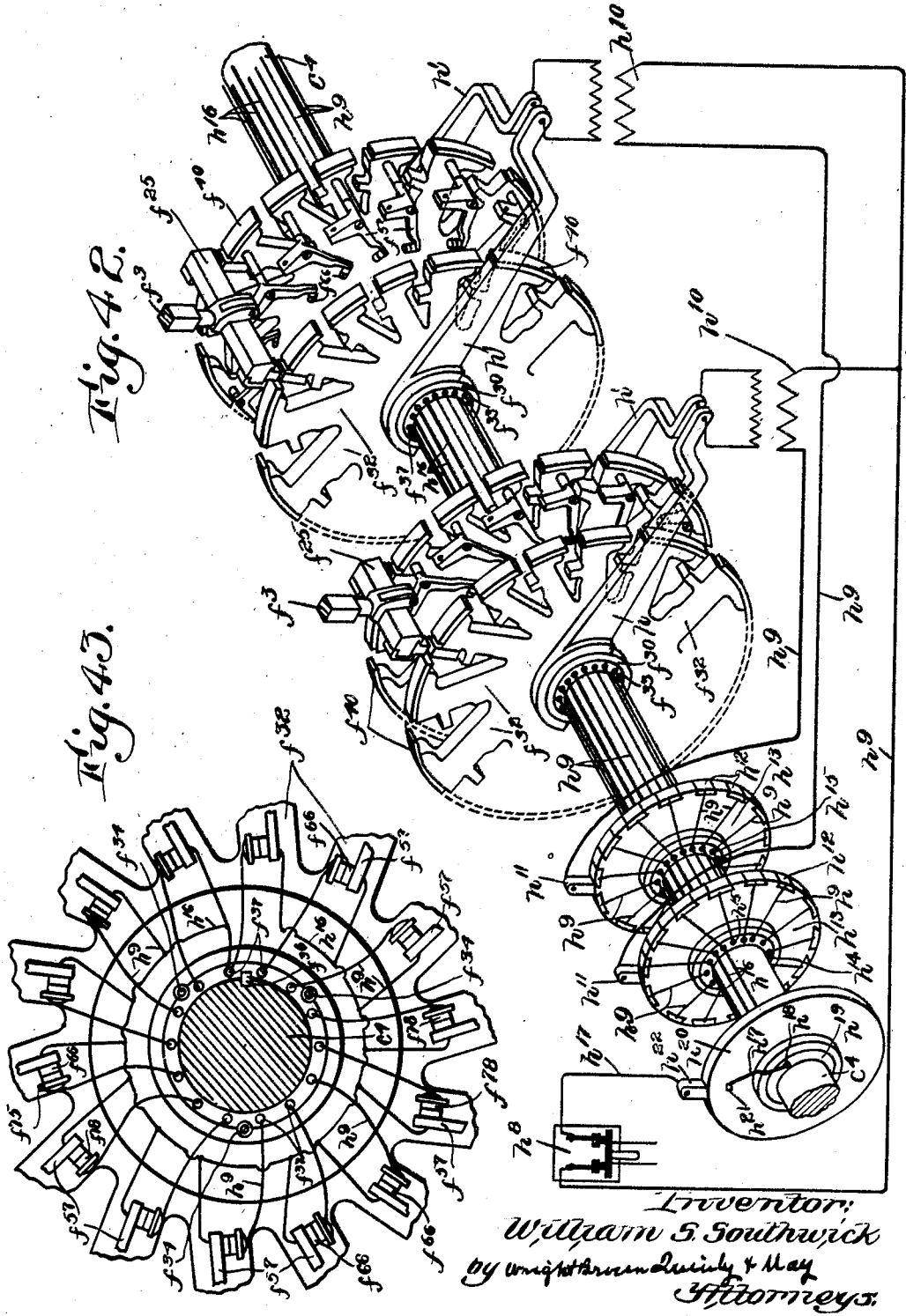

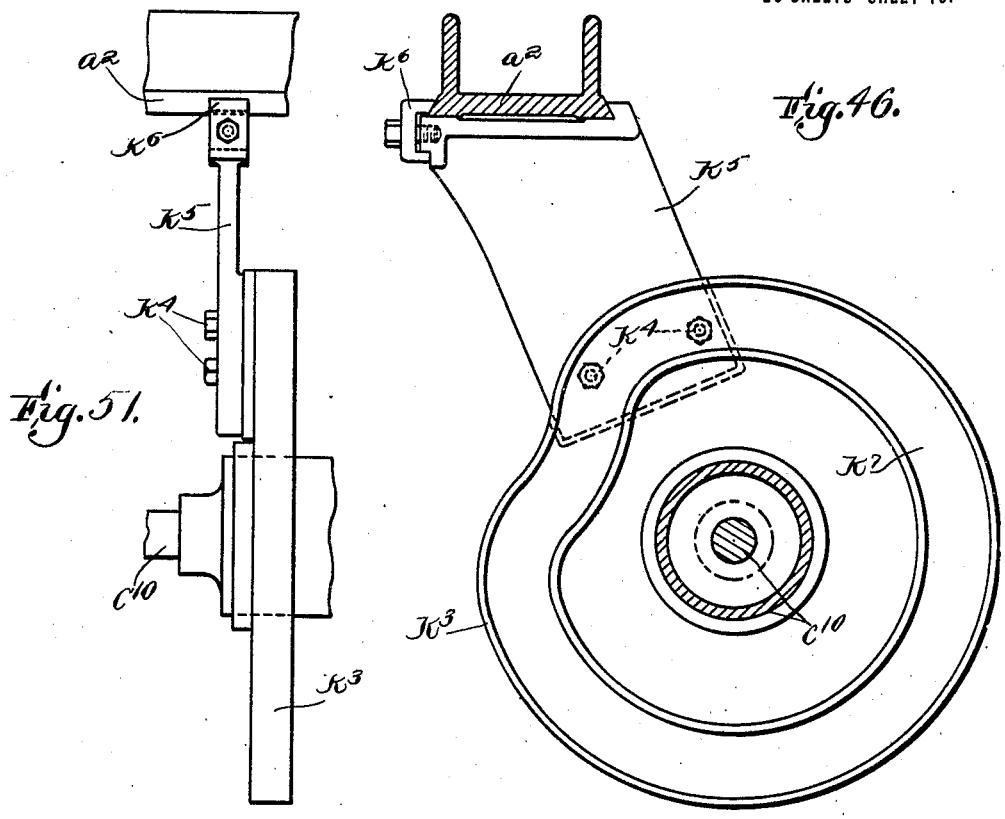
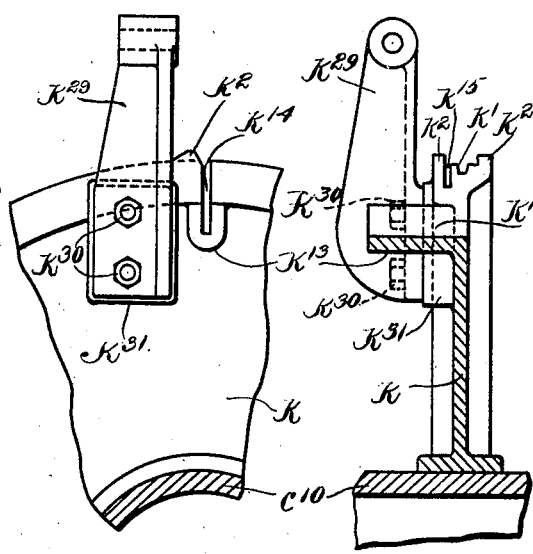
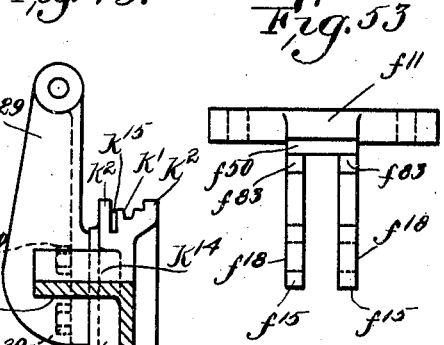
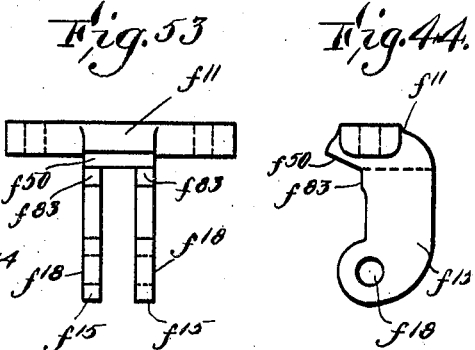
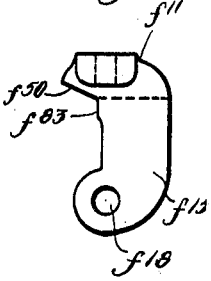

W. S. SOUTHWICK.
ROTARY WELDING MACHINE.
APPLICATION FILED APR. 22, 1918.
1,367,212.
Patented Feb. 1, 1921.
20 SHEETS—SHEET 20.
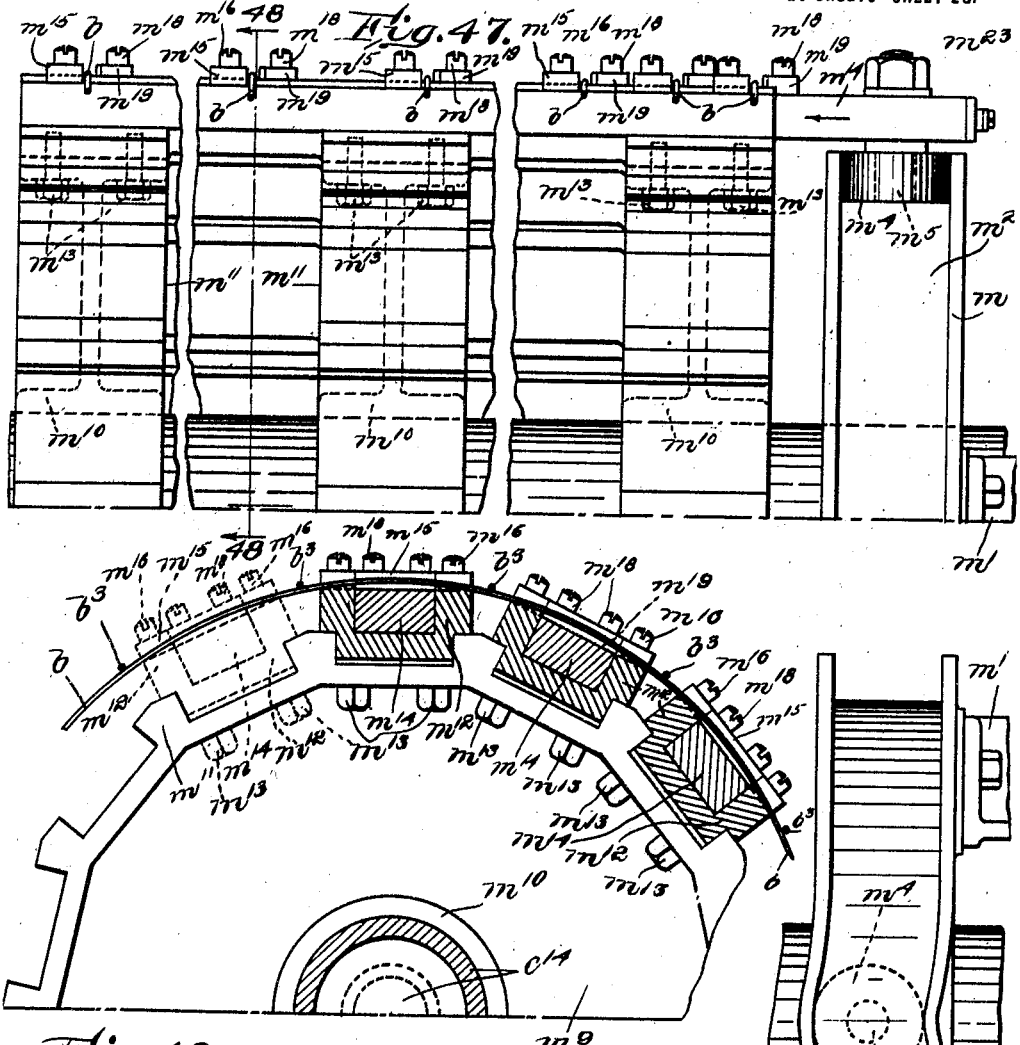
Fig. 47.
Fig. 48.
Fig. 49.
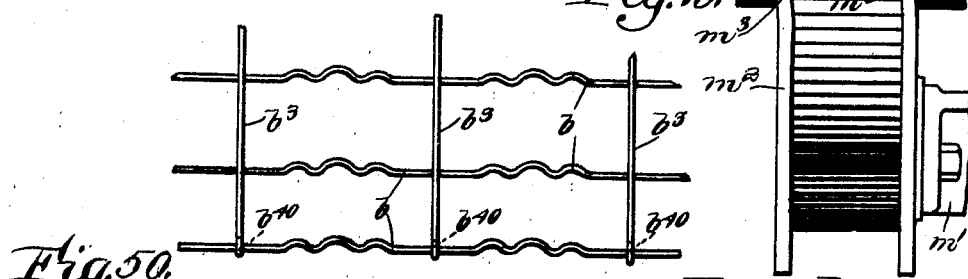
Fig. 50.
Inventor:
William S. Southwick
By Knight Brown Quinby & May
Attorneys.

UNITED STATES PATENT OFFICE.

WILLIAM S. SOUTHWICK, OF CLINTON, MASSACHUSETTS, ASSIGNOR, BY MESNE ASSIGNMENTS, TO WICKWIRE SPENCER STEEL CORPORATION, A CORPORATION OF MASSACHUSETTS.

ROTARY WELDING-MACHINE.

1,367,212.  Specification of Letters Patent.  Patented Feb. 1, 1921.

Application filed April 22, 1918. Serial No. 230,026.

*To whom it may concern:*

Be it known that I, WILLIAM S. SOUTHWICK, a citizen of the United States, residing at Clinton, in the county of Worcester and State of Massachusetts, have invented new and useful Improvements in Rotary Welding-Machines, of which the following is a specification.

This invention relates to an improvement in machines for electric welding. While the adjustments of the machine shown in the drawings are especially adapted for making fencing, the machine is not limited to such articles, but can be used for electrically welding cross and strand wires for other or any desired purpose.

In the drawings like symbols are employed to indicate like parts wherever they occur.

Figure 1 is a side elevation of a portion of that machine beginning at the feed end showing the relative arrangement of the functioning units in that part of the machine, the side framework being removed;

Fig. 2 is a side elevation of the part of the machine not shown in Fig. 1; in other words, a side elevation of the delivery end of the machine; Fig. 2, together with Fig. 1 showing a side elevation of the entire machine;

Fig. 3 is a top plan view of that part of the machine shown in Fig. 1, but omitting the top shaft at the right and the members carried thereby; also omitting the welding wheels on the lower shaft;

Fig. 4 is a top plan view of that part of the machine shown in Fig. 2;

Fig. 5 is a vertical longitudinal section of line 5—5 of Fig. 3 looking in the direction of the arrows and showing chiefly the position and relative arrangement of the driving gears that operate the functioning units in that part of the machine;

Fig. 6 is a top plan view showing the lower shaft at the right in Fig. 1, the cross girts on each side of said shaft, the secondary circuit members on the girts and connections to the members carried by the shaft, but not showing the radial extension of the members, the latter being broken off; said radial members in their entirety being shown in Fig. 1;

Fig. 7 is a top plan view of the wind-up roll shown at the extreme left in Fig. 2;

Fig. 8 is a detail view of the roll holder shown at each end of the roll in Fig. 7, illustrating the cotter pin construction for fastening the ends of the take-up rolls in the holders;

Fig. 9 is a detail perspective view of the end of the two halves of the take-up roll showing the notch or cutaway portion that lies under the cotter pin of the holder;

Fig. 10 is a detail perspective view of the cotter pin construction used to secure the take-up rolls in their holders;

Fig. 11 is a vertical longitudinal view on line 11—11 of Fig. 3 assuming the top shaft and its parts shown in Fig. 1 to be in position, this view showing the top and bottom shafts as they appear in Fig. 1 with their complemental welding jaws and the chute from the magazine conveying cross members into proper position to be received and placed in position between the complemental welding jaws;

Fig. 12 is a detail cross sectional view of the magazine chute on the line 12—12 of Fig. 11 looking in the direction of the arrows, parts of cross wires being shown in position in the magazine, the spring-operated stop or finger controlling the alinement of the cross wires being also shown;

Fig. 13 is a view similar to Fig. 11 showing a part of the upper shaft bearing the upper welding jaws and the magazine, magazine throat, part of the magazine chute, and a device located at the magazine throat for moving the cross wires, to regulate their feed or delivery in the chute in sequence and to prevent clogging at this point;

Fig. 14 is a detail enlarged view of the straightening rolls for the strand wire shown at the lower right-hand corner in Fig. 1;

Figure 18:
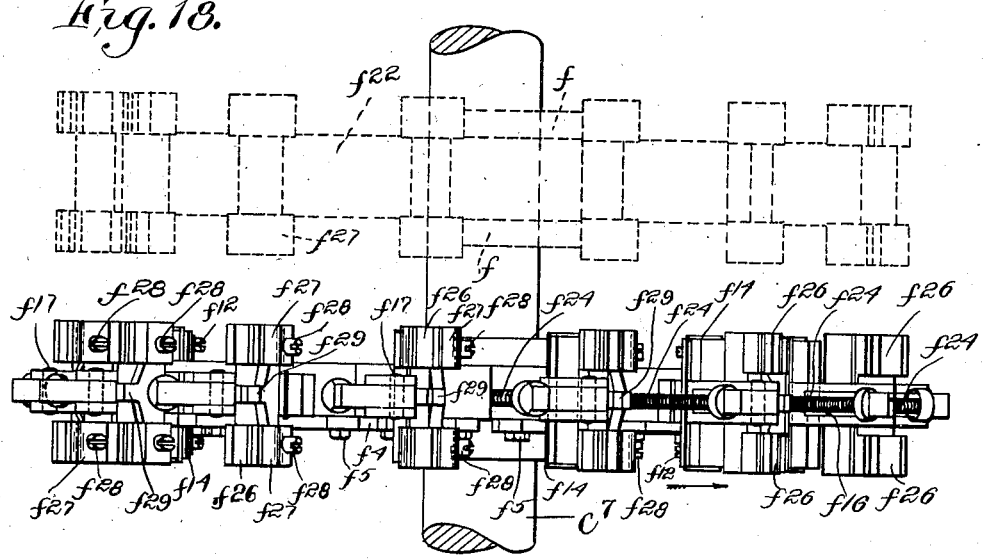
Figure 19:
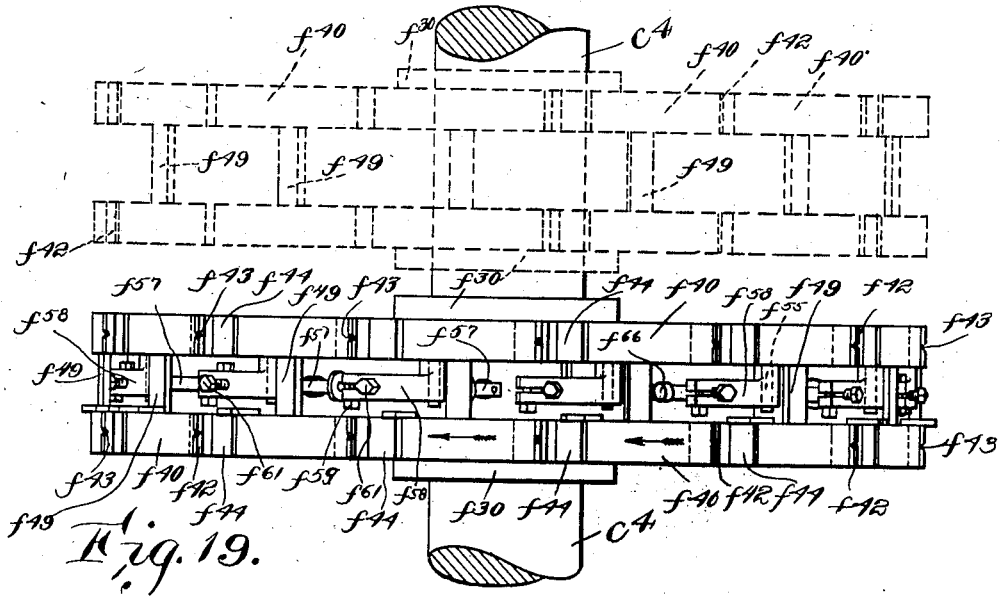
Figure 41:
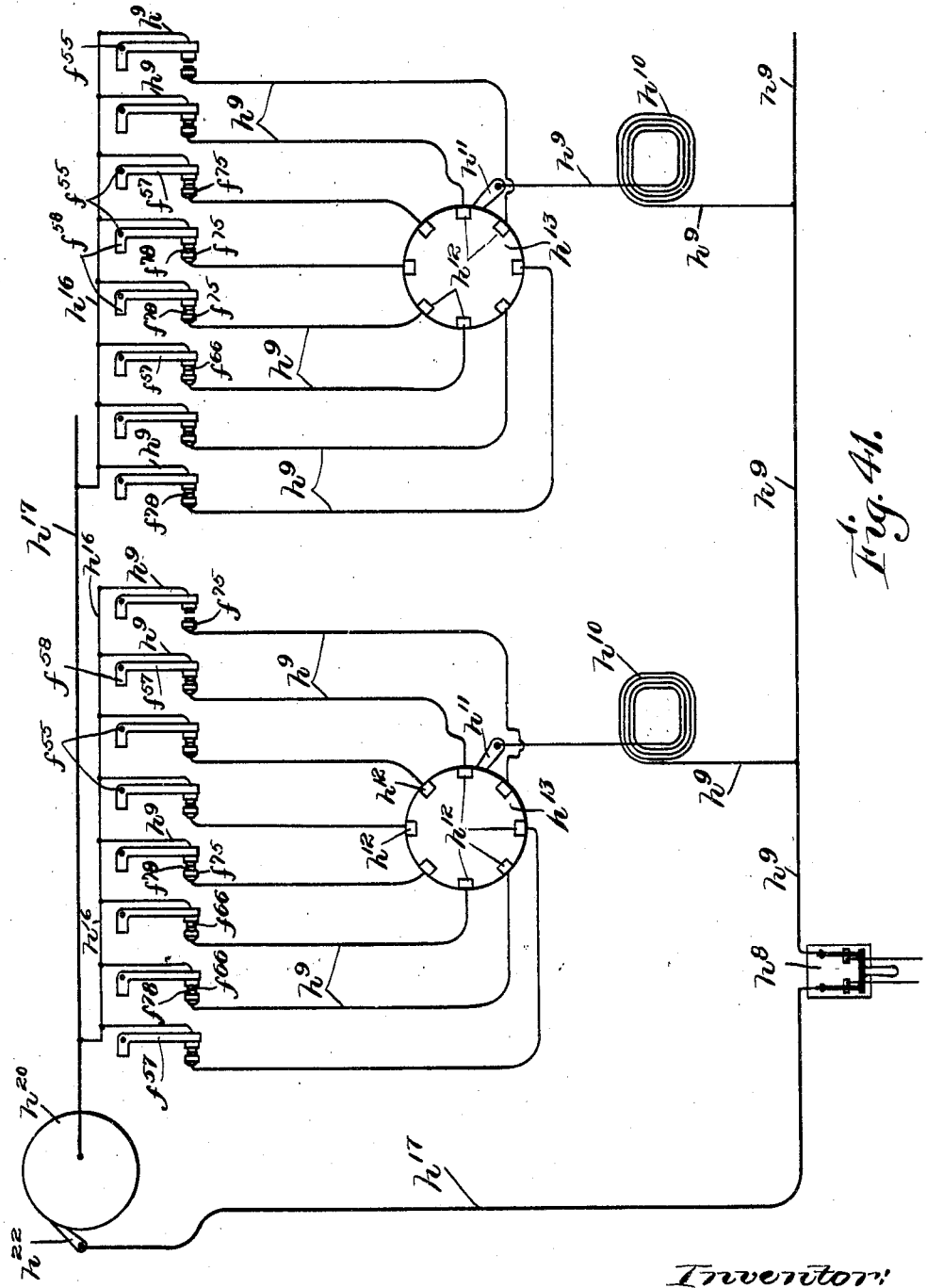

Fig. 15 is a detail view showing in side elevation three of the welding jaws carried by the lower shaft and the three complemental welding jaws carried by the upper shaft at the right-hand end of Fig. 1; also showing the delivery end of the magazine chute and the means for removing one stay wire at a time from the delivery end of said chute and putting it in position between two complemental welding jaws for welding said stay wire to a strand wire; in this figure the bottom stay wire in the hopper chute is shown in the position occupied after it had been engaged by the proper mechanism and moved slightly away from the end of the chute toward the position where the welding operation is performed;

Fig. 16 in a top plan view shows the parts illustrated in Fig. 15;

Fig. 17 is a detail view looking into the machine from the right in Fig. 15 showing at the bottom the drum on the lower shaft provided with a groove to receive a strand wire, and further showing a portion of the stay wire that has been dropped from the chute on to the strand wire and also showing one of the several spring fingers that serve to keep the stay wire in proper alinement with the cross wires of the magazine until other mechanism positively engages said stay wire and carries it forward between the welding jaws;

Fig. 18 is a detail top plan view of part of the upper shaft at the right in Fig. 1 illustrating one of the gangs of welding jaws carried by that shaft;

Fig. 19 is a view similar to Fig. 18, but taken with reference to the lower end shaft shown at the right in Fig. 1 and showing the lower welding jaws;

Fig. 20 is a detail view showing in side elevation one of the upper welding jaws and one of the lower welding jaws in position with the stay wire and strand wire engaged by said jaws just at the beginning of the welding operation;

Fig. 21 is a view similar to Fig. 20 showing the parts in the position they occupy after their subsequent movement from the position shown in Fig. 20, the parts in this view appearing in the position they occupy at the end of the welding operation;

Fig. 22 in front elevation shows the upper and lower welding jaws represented in Fig. 21;

Fig. 23 is a detail perspective view of one of the upper welding jaws, there being a series of said welding jaws in each gang and a series of gangs on each shaft, the number of jaws and the number of gangs being variable to suit different kinds of work;

Fig. 24 is a detail sectional view on line 24—24 of Fig. 21 showing the plunger of the welding jaw, the insulated head carried thereby, and the shank of the welding jaw pivoted in position;

Fig. 25 is a detail view of the end of one of the radial wheels carried by the lower shaft at the right in Fig. 1, showing the groove for receiving and guiding the strand wires and a driver for engaging and carrying forward the lower stay wire in the magazine chute;

Fig. 26 is a cross sectional view on the line 26—26 of Fig. 3 looking in the direction of the arrows, showing a part of the coiling and crimping apparatus, the cam wheel bracket being omitted; these parts being carried respectively by two companion shafts shown in the middle portion of Fig. 1;

Fig. 27 in side elevation shows one of the coiling devices;

Fig. 28 is an end view of the coiling mechanism shown in Fig. 26, showing the parts in position and showing coiler shoe in position to give the second and final coiling movement to the end of the stay wire;

Fig. 29 is a detail plan view of the coiling mechanism shown in Fig. 28;

Fig. 30 is a detail sectional view on the line 30—30 of Fig. 28, showing the cam roll and cam roll guide for operating the coiler shoe of Fig. 28;

Fig. 31 is a detail perspective view of the periphery of one of the coiling wheels, there being one on each end of the strand feed shaft, showing the strand wire in position in the groove and a cross wire engaged by coiling fingers which also, because the stay wire has been previously welded to the strand wire, assists in pulling the fabric through the machine;

Fig. 32 is a side elevation of one of the feed wheels on the strand feed shaft;

Fig. 33 is a front elevation of one of the feed wheels shown in Fig. 32; the construction being such that the strand wire is received in a groove in the wheel while teeth engage the stay wires and because of the fact the stay wires have been welded to the strand wires, these wheels act to drag the fabric through the machine;

Fig. 34 is a detail plan view of one of the crimper heads carried by the crimping shaft or the shaft next in sequence beyond the strand feed shaft that carries the coilers;

Fig. 35 is a side elevation of the part of the crimper head shown in Fig. 34, the parts being broken away at the right to show the cam roll and the groove in the cam wheel by which sidewise motion is imparted to the crimper bar;

Fig. 36 is a detail perspective view of a stud shown in Fig. 35 carrying the cam roll, that operates the crimper bar;

Fig. 37 shows in detail a side elevation of the controlling mechanism for cutting the strand wires, the mechanism being shown in relation to the rest of the machine in Fig. 1 just over the shaft that carries the crimpers;

Fig. 38 is a front elevation of the parts shown in Fig. 37;

Fig. 39 is a top plan view of the parts shown in Fig. 37;

Fig. 40 is a detail view in side elevation of the parts shown at the left in Fig. 38, at the top in Fig. 39, shown at the back in Fig. 37; these parts constituting the ratchet mechanism for feeding the shaft that in turn controls the feed and position of the controlling rolls that in turn regulate the point and time at which the strand wires are cut;

Fig. 41 is a diagrammatical view of the electrical circuit connections of the machines;

Fig. 42 is a detail view of the lower right-hand shaft shown in Fig. 1 or the shaft carrying the lower welding jaws; this view showing two gangs of lower welding jaws and also showing, reading from the left-hand end of this figure to the right, first, a return switch for primary current; second, a time switch for primary current; third, a time switch for primary current, there being a time switch for primary current for each gang of welding jaws and a return switch for primary current for all the gangs. There may be any number of gangs arranged on a shaft each with its time switch. This view also shows the secondary circuit and diagrammatically the transformer;

Fig. 43 is a side elevation of the inner part of one of the wheels that supports the lower welding jaws, this view showing diagrammatically the primary wiring from the time switches to the break switches and the return primary wiring from the break switches to the primary return switch.

Fig. 44 is a detail view of the head and ears that support the electrodes carried by the shaft $c^7$;

Fig. 45 is a detail view showing one of the arms carried by the outside coiling wheels for supporting the coiling shoe levers;

Fig. 46 is a detail view showing connection of the cam wheel brackets to the cross girt;

Fig. 47 in front elevation shows in part the crimping mechanism;

Fig. 48 is an end view of the parts shown in Fig. 47;

Fig. 49 is a development of the path of the cam shown at the right in Fig. 47;

Fig. 50 is a detail view of a piece of the welded fabric showing the action of the crimping members on the strand wires;

Fig. 51 is a side elevation of the parts shown in Fig. 46;

Fig. 52 is a front elevation of the parts shown in Fig. 45;

Fig. 53 is a front elevation of the upper welding jaw holder shown in side elevation in Fig. 44.

It is well known in the art that an alternating current must be employed in the primary and an alternating current is induced in the secondary of the transformer. Since this is a well-known feature I shall in my description of the circuits refer to the passage of the current in one direction only, it being understood that an alternating current is employed and that the direction of the current would be reversed at each alternation.

Referring to Figs. 1, 3 and 5, the framework of the machine comprises side frames, as $a$, $a$, of a suitable design, held together by cross girts $a'$ $a'$, there being as many cross girts as desired not only for securing the rigidity of the framework, but also for mounting the parts of the operating mechanism.

$c$ represents a pulley that may be driven from any desired source of power. The pulley $c$ is rigidly mounted upon a short shaft $c'$ that in turn is held in boxes on one of the side frames $a$ in the usual way. This shaft projects through the frame $a$ and to its inner end is rigidly secured a spur gear $c^2$ that meshes with a spur gear $c^3$ fast on a shaft $c^4$ that extends entirely across the machine, the ends of the shaft $c^4$ being mounted in boxes $c^5$ connected to the side frame $a$. The spur gear $c^3$ in turn meshes with a spur gear $c^6$ (see Fig. 5), that in turn is rigidly mounted upon a shaft $c^7$, which like shaft $c^4$ extends across the machine. The ends of the shaft $c^7$ are carried by boxes $c^8$ which are supported by vertical extensions $a^2$ of the side frames $a$ $a$ in such a way as to position the shaft $c^7$ substantially over the shaft $c^4$. The arrangement of the gearing so far described is such that the gear $c^3$ serves to drive the shafts $c^4$ and $c^7$ and the parts carried by said shafts in unison. The gear $c^2$ upon its opposite or rear side meshes with a spur gear $c^9$, rigidly mounted on a shaft $c^{10}$, that extends crosswise the machine. The ends of the shaft $c^{10}$ are supported in boxes $c^{11}$ secured to the side frames $a$. $c^{12}$ represents a spur gear also fast on the shaft $c^{10}$ meshing with a spur gear $c^{13}$ fast on a shaft $c^{14}$ that extends across the machine with its ends mounted in boxes $c^{15}$ secured to the side frame $a$. $c^{16}$ represents a second spur gear fast on the shaft $c^{14}$ that meshes with a spur gear $c^{17}$ fast on the inner end of a short shaft $c^{18}$ that is mounted in a box $c^{19}$ secured to one of the side frames $a$. The shaft $c^{10}$ is extended beyond the side frame $a$ and upon said extension is rigidly mounted a pulley $c^{20}$. $c^{21}$ (left side of Fig. 3) represents a shaft extending crosswise the machine mounted in boxes $c^{22}$ secured to the side frames $a$. The shaft at one end is extended beyond the side frames and carries rigidly mounted thereon a pulley $c^{23}$. $c^{24}$ represent a belt mounted on pulleys $c^{20}$, $c^{23}$. By the arrangement of shafts and gearings just described, the gear $c^2$ by turning the gear $c^9$ and the shaft $c^{10}$ turns the gear $c^{12}$, which drives the gear $c^{13}$ and the shaft $c^{14}$, thereby driving the gear $c^{16}$ and its companion gear $c^{17}$ and the shaft $c^{18}$. The shaft $c^{10}$ in turn, by means of the pulley $c^{20}$ and belt $c^{24}$, drives the shaft $c^{21}$ through the pulley $c^{23}$. All of the parts so far described, except shaft $c^{21}$, are driven continuously.

The intermittent drive of the shaft $c^{21}$, is described by the following mechanism (referring to Fig. 3):

$c^{25}$ represents a stud secured in a boss $c^{26}$ of the framework $a$ and held in place by a nut $c^{27}$. Upon this stud $c^{25}$ is loosely mounted a sleeve $c^{28}$. To the outer end of the sleeve $c^{28}$ is secured a hub $c^{29}$ provided with an arm $c^{30}$ carrying on its outer end a cam shoe $c^{31}$ (see Fig. 5). From the inner end of the sleeve $c^{28}$ projects rearwardly an arm $c^{32}$ provided with fingers $c^{33}$ between which is arranged an arm $c^{34}$, one end of which is loosely mounted on the stud $c^{25}$. The outer end of the arm $c^{34}$ is provided with a stud $c^{35}$ upon which is loosely mounted an idle pulley $c^{36}$. $c^{37}$ represents a coiled spring arranged between the upper finger $c^{33}$ and the arm $c^{34}$ in order to keep the arm and its pulley $c^{36}$ yieldingly pressed down. The arrangement of the parts just described is such that when the cam shoe $c^{31}$, Fig. 5, is raised at its upper or working position, or the position shown in Fig. 5, such movement of the cam shoe $c^{31}$ depresses the idler $c^{36}$, thus putting the belt $c^{24}$ under tension. During such time as the cam shoe $c^{31}$ is held up, the shaft $c^{21}$ will be driven by the pulley $c^{23}$ and such rotation of the shaft $c^{21}$ will continue until the cam shoe $c^{31}$ drops down to its idle position, not shown.

$c^{38}$ represents a second pulley fast on the shaft $c^{21}$, upon which is mounted a bolt $c^{39}$, that at its farther end is arranged upon a pulley $c^{40}$ (Figs. 4 and 7), that in turn is rigidly mounted upon the outer end of a trunnion $c^{41}$, that in turn is mounted in a box $c^{42}$ carried by a standard $a^3$ that may or may not be made a part of the framework of the machine.

On the opposite side of the machine from the box $c^{42}$ is a box $c^{43}$ on which in like manner is arranged a trunnion $c^{44}$. Each of these trunnions on its inner end carries a head $c^{45}$ provided with an inwardly projecting central flange $c^{46}$ and with an inwardly projecting flange $c^{47}$ formed semi-circular with reference to the head $c^{45}$, while the central flange $c^{46}$ takes the position of the diameter of the circle represented by the head (see Fig. 8). In each of these flanges $c^{46}$ is formed an aperture $c^{48}$ to receive a locking pin $c^{49}$ (see Figs. 8 and 10). $b^5$ represents a fabric roll formed in two parts $c^{50}$, $c^{50}$. Each part is dropped into a socket formed by the projections $c^{46}$ and $c^{47}$ and thereafter locked in those sockets. By passing the locking pin $c^{49}$ through the aperture $c^{48}$ the ends of the rolls are securely locked in position. In practice one-half of the roll is dropped into the heads, then the fabric is placed against the inner face of this half of the roll; thereafter the second half of the roll is dropped in its place and the pins are applied. This locks the fabric between the two halves of the rolls in the starting of the machine. When it is desired to remove the fabric from the machine the locking pins are removed and the fabric roll $b^5$ turned until the flange $c^{47}$ is at the top. Then the roll will drop out of the heads on the floor or on a truck.

Referring to Figs. 1 and 3, $b$ represents a series of strand wires, here shown as twelve, although the number may be varied as desired and the spacing apart may be also varied as desired to suit the requirements of each individual fabric. Each of these strand wires coming from a source of supply passes through a series of straightening rolls $b^1$, over the lower welding drum hereinafter described, and between the said drum and the upper welding drum hereinafter described. The number and arrangement of the strand wires as shown and their position passing through the machine are indicated clearly in Figs. 1, 2, 3 and 4.

$b^2$ represents a hopper for holding stay or cross wires $b^3$. These stay wires $b^3$ are electrically welded by the machine to the strand wires at predetermined distances apart, depending upon the character of the fabric to be produced. The relative position of the stay wires $b^3$ after being welded to the strand wires $b$ is shown in Figs. 1, 2, 3 and 4.

Referring to Figs. 1 and 3, the fabric formed by the welding of the stay wires to the strand wires will be designated throughout this specification by symbol $b^4$: said fabric after completion of the operations following the welding operation being assembled on a fabric roll $b^5$, see Fig. 2.

Referring now to Figs. 1, 3 and 16, the hopper $b^2$ is shown as a trough-like structure extending crosswise the machine. The rear wall of the trough is formed by a series of bars $b^6$ spaced any desired distance apart; each of these bars are formed with a flange provided with ears $b^7$ arranged upon rods $b^8$ secured to the framework of the machine. The two rods $b^8$ appear in elevation in Fig. 1 and the top one of these two rods appears in plan in Fig. 3. The two outside bars $b^6$ are formed with plates $b^9$ which constitute the ends of the hopper and maintain the stay wires $b^3$ in proper endwise position. Opposite the front of each bar $b^6$ is arranged a bar $b^{10}$, one of these bars appearing in elevation Fig. 1, and two appearing in section in Fig. 16. The upper ends of the bars $b^6$ and $b^{10}$ form the front and rear side of hopper respectively; plates $b^9$ forming the ends of hopper. Each of the bars $b^{10}$ is formed with two ears $b^{11}$ that are mounted upon rods $b^{12}$, see Fig. 1. Each of the rods $b^{12}$ has its end mounted in a casting $b^{13}$, see Fig. 16, that in turn is adjustably connected to the side frame $a$ by a bolt $b^{14}$ arranged in a slot $b^{15}$ in the casting $b^{13}$ and engaging a screw-threaded hole in the side frame $a$. By reason of this adjustment of the front bars $b^{10}$ the distance from the lower portions of the bars $b^6$ can be adjusted to form a throat for the hopper of a width to correspond to the diameter of the stay wire to be fed therethrough, so that one wire can pass from the throat at a time. This throat $b^{16}$, see Figs. 1 and 15, extends down sufficiently close to the plane of the strand wires $b$ that but one stay wire $b^3$ can pass along between the strand wire and the lower end of the throat at a time. The space between the bottom of the throat $b^{16}$ and the strand wires $b$ may be varied to suit the diameter of the stay wires $b^3$. This may be secured by making the throat the proper length for the desired strand wire as shown in drawing or by making the throat adjustable vertically if desired. I have not shown such adjustability because ordinarily the stay wire used in such work varies very little in diameter.

Referring to Figs. 1 and 3, $b^{17}$ represents a series of shoes having curved faces as shown, each of these shoes formed on the end of an arm $b^{18}$, there being five of these arms and their corresponding shoes in the machine as shown, see Fig. 3. Each of these arms is formed with a hub $b^{19}$ rigidly secured on a shaft $b^{20}$, the ends of which are loosely mounted in a box in the side frames $a$. $b^{21}$, see Fig. 3, represents another arm, the hub of which is also rigidly secured to the shaft $b^{20}$. This arm consists of a lever or a crank, and its free end, see Fig. 1, is connected to the upper end of a pitman $b^{22}$. The lower end of the pitman $b^{22}$ is connected to an eccentric strap arranged on an eccentric rigidly mounted on a shaft $c^1$ in the usual way. The strap and eccentric are shown conventionally, indicated by the symbol $b^{23}$, in Fig. 1, this having ordinary construction. The shape and position of the shoes $b^{17}$ are such that as they are operated through the oscillation of the shaft $b^{20}$ they serve to impart motion to the piling stay wires $b^3$, preventing their clogging at the throat of hopper, and insuring their presentation one at a time at said throat. As before stated, the throat $b^{16}$ should be positioned sufficiently close to the strand wires $b$ so that but one stay wire $b^3$ can be underneath the throat at a time in engagement with the strand wires $b$.

Referring to Figs. 11 and 12, each of the bars $b^{10}$ at its lower end, see Fig. 15, is formed with a projection or a lug arranged on the feed side or front side of the hopper; this lug projects down to substantially the plane occupied by the top of the strand wires so that the stay wire, dropping from the throat of the hopper $b^{16}$, cannot roll or pass to the front of the machine. Each of the bars $b^6$, see Figs. 11, 15, 16 and 17, is formed with a web $b^{25}$. In each one of these webs $b^{25}$ is riveted the reduced end $b^{26}$, see Fig. 17, of a pin $b^{27}$. The shoulder of the reduced end $b^{26}$ engages one side of the web $b^{25}$, and the end of the reduced portion $b^{26}$ being upset against the opposite side of said web. Any desired means may be employed for rigidly securing such pin to the web. Loosely mounted upon the pin $b^{27}$ is a hub $b^{28}$, see Fig. 17, that carries a stop finger $b^{29}$, that projects down below the plane of the throat $b^{16}$ and at the rear of said throat to prevent the stay wires $b^3$ being moved forward accidentally by the friction of the strand wires. In the form of the machine shown, there is one of these fingers mounted on each of these webs $b^{25}$.

Referring to Figs. 11 and 17, $b^{30}$ represents a thimble mounted upon the pin $b^{27}$ and secured to said pin at its closed end by a pin $b^{31}$. $b^{32}$, Fig. 11, represents a coil spring arranged about the pin $b^{27}$ in the chamber of thimble $b^{30}$; one end of said spring being secured to the end of the thimble while the other end of said spring is secured to the finger $b^{29}$. By this arrangement these fingers yieldingly prevent the feeding motion of the stay wires $b^3$ from the throat of the hopper, due to the friction of the strand wires. By this construction a stay wire is continuously and automatically present, in position at the end of the throat, and resting upon the strand wires ready to be engaged by mechanism hereinafter described, and fed forward to the welding jaws. The relative position of the stay wire, the strand wire, and the spring finger is shown in Fig. 17.

$b^{33}$ is an arm formed at its rear end with a hub $b^{37}$ loosely mounted on a pin $b^{38}$ carried by or connected to the web $b^{25}$. This arm is curved as shown, its free end extending toward the rear of the machine, or in the line of the feed of the strand wires through the machine. Each of these arms is pressed downward yieldingly by a spring $b^{34}$ arranged between said arm and a lug $b^{35}$ secured to the web $b^{25}$. The function of these yielding arms $b^{33}$ is to prevent the stay wire $b^3$ from flying up or from other displacement as they are positively, by means hereinafter described, fed forward from the throat of the hopper and grasped by the welding jaws hereinafter described.

It results from the mechanisms that I have described under the symbol $b$, that a stay wire is automatically present upon the strand wire at the throat of the hopper at all times, in position to be positively fed to a position to be grasped by the welding jaws, the parts being so arranged that said stay wire cannot fall out from the front of the machine, will not be drawn out of position by the friction of the strand wires, and will not become displaced vertically in the feeding action from the throat of the hopper to the welding jaws.

$b^{36}$, Fig. 15, is a lug on the web $b^{25}$ adapted to engage and act as a stop for a lug $b^{39}$ on a hub $b^{37}$ in order to prevent the arm $b^{33}$ dropping into, and engaging with, moving parts of the machine when it is not held up by stay wires $b^3$.

Referring to Figs. 1, 5 and 6, the shaft $c^7$ is shown as positioned over the shaft $c^4$, shaft $c^7$, in Fig. 1, being driven in the direction of the hands of a watch, while the shaft $c^4$, in Fig. 1, is driven in the direction opposite to that of the hands of a watch. These two shafts carry the welding jaws and the connections and operating parts by which current is supplied to and shut off from the parts to be welded.

Referring to the upper shaft $c^7$, Figs. 1, 5, 11 and 13, in addition to the gear $c^6$ there is rigidly mounted upon this shaft a series of hubs $f$, in proper position to correspond with the position of the strand wires passing through the machine. These hubs may be secured to the shaft by setscrews, keys or any desired way. In this machine as shown there is one of these hubs $f$ on the shaft $c^7$ for each pair of strand wires; this part, however, can be varied to suit the design of the machine. Each of these hubs $f$ is formed with a web $f'$, see Fig. 22. Each of these webs, Figs. 13, 20, 21 and 22, is formed with a series of radial open chambers or recesses $f^2$, Figs. 13, 21 and 22. At the outer end of each chamber $f^2$ is arranged a sliding plunger $f^3$, Figs. 21 and 22; this is shown as rectangular in shape and held in its seat by a cap $f^4$ secured by bolts $f^5$ to the walls of the chamber. Rigidly connected to the inner end of the plunger $f^3$ or integral therewith is a cylindrical extension $f^6$. $f^7$ represents a reduced part of the cylindrical extension $f^6$ arranged through a suitable opening in the inner end of the wall of the chamber $f^2$. Upon the outer end of the reduced part $f^7$ is arranged a nut $f^8$ to maintain the plunger in its bearings, and also to apply the desired pressure to a spring $f^9$ arranged in the chamber $f^2$ around the cylindrical extension $f^6$; one end of the coil spring bearing upon the inner end of the plunger $f^3$, and the other end of the spring bearing against the wall of the inner end of the chamber as shown in Fig. 13. The nuts $f^8$ are preferably split, so-called, in order to insure the maintenance of the nut in any adjusted position.

Referring to Fig. 24, the lower end of the plunger $f^3$ is formed with a head $f^{10}$. $f^{11}$ represents a complemental head or plate secured to the head $f^{10}$ by screws $f^{12}$; the latter being insulated from the head $f^{10}$ by insulating material $f^{13}$, while the heads or plates $f^{10}$, $f^{11}$, are insulated from each other by insulating material $f^{14}$. The complemental head $f^{11}$ is formed with two parallel ears $f^{15}$. Between the ears $f^{15}$ is arranged a tongue $f^{16}$, Fig. 23, pivoted thereto by a pin $f^{17}$ and passing through suitable holes in the ears $f^{15}$ and a hole $f^{18}$ in the tongue $f^{16}$. The hole $f^{18}$ is indicated in Fig. 24 as beveled or enlarged at each end in order to give the tongue $f^{16}$ a slight rocking motion on the pin $f^{17}$, thereby allowing the upper electrodes hereinafter described a slight rocking motion to compensate for any inequalities in the thickness of the material or any inequalities in the welds.

The rear end of the tongue $f^{16}$ is formed with a cup-shaped depression or bearing $f^{19}$, Figs. 20, 21 and 23, adapted to receive a head $f^{20}$ of a pressure bolt $f^{21}$, the end of which is arranged in a suitable aperture in a flange or extension $f^{22}$ of the web $f'$. $f^{23}$ represents insulating bushing arranged in the extension $f^{22}$ about the bolt $f^{21}$ to insulate the bolt from the extension. $f^{24}$ represents a coil spring arranged between the head $f^{20}$ of the bolt and the bushing $f^{23}$. This spring serves to yieldingly press the head $f^{20}$ against its bearing $f^{19}$.

Referring to Fig. 23, the forward end of the tongue $f^{16}$ is formed with an integral transverse head $f^{25}$. This head upon each side of the tongue $f^{16}$ is grooved or shaped to receive electrodes $f^{26}$, each electrode being held against the head by a special clamp $f^{27}$. It will be understood that the tongue $f^{16}$ and the head $f^{25}$ are integral and made of copper or some other suitable material, and that the two electrodes $f^{26}$ are also of copper, or some other suitable material. Each of the clamps $f^{27}$ is secured to the head $f^{25}$ by screws $f^{28}$, Fig. 22. The head $f^{25}$ between the clamps $f^{27}$ is formed with a depending projection or break switch finger $f^{29}$ for the purpose hereinafter described. The parts $f^1$ to $f^{29}$ constitute what might be termed one of the upper welding jaws, there being a series of these jaws radially arranged around the web $f'$.

In Fig. 1, the web is shown as provided with fourteen of such jaws. This practice may be varied to suit the design of the machine and to correspond with the lower welding jaws of the shaft $c^4$. It will be noted that each of the upper welding jaws on the shaft $c^7$ is double, see Fig. 22, so that two welds can be made simultaneously by said jaw and its companion lower jaw. There are no electric circuits connected with the upper welding jaws, the current passing in through one electrode $f^{26}$, through the head $f^{25}$, out through the complemental electrode $f^{26}$, and back through the work and the lower welding jaws, as hereinafter described. This is an important feature of my machine since it does away with a large amount of electric circuits and connections that would be necessary if the secondaries were connected directly with the upper welding jaws.

Referring to Figs. 1 and 11, there is arranged a series of pairs of copper castings, each consisting of a hub $f^{30}$, see Fig. 22, rigidly secured to the shaft, from which extends a flange $f^{31}$, while from the flange $f^{31}$ projects a series of radial arms $f^{32}$. These hubs $f^{30}$ as shown are secured to a sleeve $f^{33}$ by means of insulated pins $f^{34}$, see Fig. 11. A layer of insulating material is interposed between each hub $f^{30}$ and each sleeve $f^{33}$. Each sleeve $f^{33}$ in turn is arranged upon the shaft $c^4$ and secured thereto by a key as $f^{36}$. The sleeve $f^{33}$ as shown is formed with a series of holes $f^{37}$ to permit the passage of wires for the primary circuit. These wires being covered with insulated material need no other protection at this point.

Referring to Fig. 22, $h$ represents bars of the secondary circuit arranged in contact with the hub $f^{30}$, while $h'$ represents bars of the secondary circuit arranged in contact with the companion hub $f^{30}$; the welding current being led in to the hub $f^{30}$ by means of one bar of the secondary circuit, and returned to the transformer through the other bar of the secondary circuit.

Each of the arms $f^{32}$ is formed with a block or head $f^{38}$, Fig. 25, whose outer face $f^{39}$ constitutes part of the arc of the circle of which the arm would constitute a radius. $f^{40}$ represents a steel plate secured by screws $f^{41}$ to their face $f^{39}$; and formed upon its rear end, or the end opposite its direction of rotation when entering the machine, is a lip $f^{42}$ formed with a notch $f^{43}$ to receive and guide the strand wire $b$, see Figs. 1, 11, 17, 20 and 21. The steel plate serves to protect the head $f^{38}$ from wear, while its notched lip $f^{42}$ serves to receive and guide a strand wire and maintain the latter in proper position before and during the welding operation.

Upon the face of the head $f^{38}$ or the side facing the direction of the rotation of the head in the machine, is secured an electrode $f^{44}$. Each of said electrodes as shown in Fig. 22 is formed with a slot $f^{45}$. A bolt $f^{46}$ arranged at said slot and screwed into the head $f^{38}$ serves to bind said electrode in position on said head. $f^{47}$ represents a lug on the arm $f^{32}$ below the head $f^{38}$ and its electrode $f^{44}$. $f^{48}$ represents a set-screw arranged in each lug $f^{47}$, arranged to engage the lower face of each electrode $f^{44}$. By means of the set-screw each electrode can be adjusted to the desired height and then locked in that position by the bolt $f^{46}$. The radial adjustment of the lower electrodes $f^{44}$ by means of the set-screws $f^{48}$ enables the lower electrode to be positioned with respect to the upper electrode and the plate $f^{40}$ to make the proper weld, and provides further means for taking up wear.

Referring to Fig. 25, $f^{49}$ represents a block of insulating material arranged between each pair of heads $f^{38}$ and secured to said heads, see Figs. 20, 21 and 25. This block serves as a stop and support for the lower side of the cup-shaped depression $f^{19}$ of the tongue $f^{16}$; that is, it stops said tongue against the downward action of the pressure bolt $f^{21}$ and supports said tongue against the downward action created by the upward thrust of the work against the upper electrodes $f^{26}$ and the subsequent similar action created by the operation of the break switch finger $f^{29}$. The construction, arrangement and mounting of the upper and lower welding jaws and their associate parts are such that said jaws move in unison at the time of the engaging of the stay wire with the strand wire, at the time of the welding of the two wires together and until the subsequent release of the two wires from the jaws. The jaws travel in unison, that is, one jaw travels in an arc corresponding to the arc of the other during a predetermined period due to the action of the spring $f^9$. Further, due to the pivotal or flexible mounting of one of said jaws by means of the pins $f^{17}$, the two jaws during said common arc of movement are compelled by means of the bearing $f^{49}$ to so travel in fixed relation to each other and to the work without any rolling contact; that is to say, with a fixed as distinguished from a rolling contact on the work, as would be the case if neither of the jaws had any pivotal or equivalent flexible connection with its support. Both these features, to wit, the action of the spring $f^9$ and the flexible connection produced by the pin $f^{17}$ are important and their functions are concurrent in time, one securing the travel of the welding jaws in complemental arcs during the welding operation and the other securing a fixed relation of the jaws to each other and to the work during said period, such as would exist if the jaw supports instead of being pivotally mounted were slidingly mounted as in the prior art. Of course, theoretically, there is a difference in the speed of one jaw as compared with the speed of the other jaw controlled by the spring $f^9$. As the latter jaw is forced back by the other jaw its radius is shortened and its speed decreased. Its speed is not constant during the travel through the common arc, but such difference is of no practical importance and can be compensated for by adjusting the initial radial length of the part carrying the yielding jaw, that is, the practical radius of the jaw when not pressed back by the companion jaw so that it has a radial length slightly in excess of that of its companion jaw.

Referring to Figs. 20 and 21, it will be noted that the material at the surface of the head $f^{11}$ between the ears $f^{15}$ is substantially at right angles to said ears or the axis of the plunger $f^8$, while the surface of the head $f^{11}$ at the left of said ears in Fig. 21, that is, toward the delivery end of the machine, is beveled upward as an incline $f^{50}$; this allows for the movement of the head $f^{25}$. The structure and arrangement are such that the incline $f^{50}$ engages the top of the head $f^{25}$ as in Fig. 20, due to the action of the pressure bolt $f^{21}$ prior to and up to the time that the electrodes grip the stay wire $b^3$ against the strand wires $b$; and immediately thereafter, that is, during the welding action, during the break switch action to cut off the welding current, and during the release of the welded strand and stay wires from the electrodes, the parts move into and out of the position shown in Fig. 21. The purpose of the incline $f^{50}$ is to co-act with the pressure bolt $f^{21}$ so that the lower part of the depression $f^{19}$ would be in proper position to engage the block of insulating material $f^{49}$. This construction enables the position of the electrodes $f^{26}$ to be predetermined with exactness at the time said electrodes engage the stay wires to grip the stay wire against the strand wires $b$ supported by the lower welding jaws. Each of the ears $f^{15}$ at the bottom of the incline $f^{50}$ is formed with a slight projection $f^{83}$, see Fig. 44, to contact with the back of the head $f^{25}$ on each side of the tongue $f^{16}$, see Fig. 23, when the parts assume the position shown in Fig. 20, in order to keep the head $f^{25}$ and the electrodes carried thereby in proper alinement to prevent a swinging motion of the head $f^{25}$, and to maintain said head in a predetermined position so that its electrodes $f^{26}$ will at all times be properly positioned in relation to their complemental electrodes carried by the shaft $c^4$.

Referring to Fig. 25, $f^{51}$ represents a steel plate rigidly secured to the side of the head $f^{38}$, by bolts or in any desired way, opposite the block $f^{49}$. There may be such plates secured to each head or to one of the heads of each pair. The top surface of this plate, beginning on the end toward the lip $f^{42}$, is formed with an upwardly inclined surface $f^{52}$ and terminates in a flat surface $f^{53}$. The front face of the plate $f^{54}$ is radial and substantially at right angles to the flat surface $f^{53}$. As the said heads $f^{38}$ rotate, the face $f^{54}$ of the plate, see Figs. 11 and 15, engages the lower stay wire $b^3$ at the mouth of the throat $b^{16}$ and carries it forward against the tension of the stop fingers $b^{29}$. As the faces $f^{54}$ carry forward the lower stay wire $b^3$ against the tension of the stop fingers $b^{29}$, the flat face or dwell $f^{53}$ on the plate $f^{51}$ comes across the mouth of the throat $b^{16}$, holding said stay wires in the throat until the stay wire being carried forward by the faces $f^{54}$ has passed forward sufficiently to let the stop fingers $b^{29}$ snap back in place at the rear of the next stay wire in the throat $b^{16}$. To insure this guarding action of the stop fingers $b^{29}$, the flat surface $f^{53}$ of the plate $f^{51}$ is continued into the incline $f^{52}$ in order to release the weight of the column of the stay wires gradually upon the strand wires. As the stay wires continue to be driven forward by the faces $f^{54}$, they pass underneath the arms $b^{38}$ until the parts reach the position shown in Fig. 20, where the strand wires are gripped between the upper electrodes $f^{26}$ and the lower electrodes $f^{44}$. During the further motion of the welding jaws to and by the position shown in Fig. 21, the stay wires are welded to the strand wires by passage of the welding current from the lower welding jaw through the work and an upper welding jaw to a companion upper jaw, then back through the work to the companion lower jaw; and by the application of pressure of the jaws upon the softening of the metal and the automatic stopping of the heating action of the jaws upon the approach of the electrodes toward each other to a predetermined distance.

Referring to Figs. 21 and 22, $f^{55}$ represents a pintle secured in the inner face of the head $f^{38}$ of each pair of heads and arranged in the space between said heads. Upon each pintle $f^{55}$ is loosely mounted a hub $f^{56}$, provided with a radially disposed arm $f^{57}$, projecting toward the axis of the arm $f^{32}$. Said hub is also formed with an arm $f^{58}$ formed at right angles to the arm $f^{57}$, as shown in Fig. 21. The end of the arm $f^{58}$ is split and the two split parts of the arm are held together by a screw $f^{59}$. The end of the split part of the arm $f^{58}$ terminates in a screw-threaded hole, in which is arranged a screw $f^{60}$. The head $f^{61}$ of the screw $f^{60}$ can be adjusted up and down to the desired position to be engaged by the finger $f^{29}$. The adjustment of the screw $f^{60}$ can be maintained by means of the screw $f^{59}$. The arm $f^{57}$ midway its ends is formed with a cup-shaped depression. A boss $f^{62}$ on the arm $f^{32}$ is formed with a complemental depression. $f^{63}$ represents a coil spring arranged in a depression of the boss $f^{62}$ and the complemental depression in the arm $f^{57}$, the purpose of said spring being to keep the upper and the lower ends of the arm $f^{57}$ in the position shown in Fig. 20, when that position is not interfered with by the action of the finger $f^{29}$ upon the head $f^{61}$ of the screw $f^{60}$. The free end of the arm $f^{57}$ is formed with a hole in which is arranged a bushing $f^{64}$ of insulating material. Closely fitted in the bushing $f^{64}$ is the shank of a screw $f^{65}$, the head of a screw $f^{66}$ being provided with the silvered surface $f^{67}$, this screw being made of copper preferably. $f^{68}$ represents a brass washer arranged on the shank of the screw $f^{65}$ outside of the bushing $f^{64}$. $f^{69}$ represents a terminal of the primary circuit arranged on the shank of the screw $f^{65}$ against the brass washer $f^{68}$ and held in place by a nut $f^{70}$. $f^{71}$ represents a plate secured by screws $f^{72}$ to the arm $f^{32}$. $f^{73}$ represents insulating material arranged between the plate $f^{71}$ and the arm $f^{32}$. The holes in the plate $f^{71}$ through which the screws $f^{72}$ pass are lined with bushings of insulating material $f^{74}$ against which not only the shank but the heads of the screws $f^{72}$ contact, the purpose being to insulate not only the plate $f^{71}$ from the arm $f^{32}$ but also to insulate the screws $f^{72}$ from the plate $f^{71}$.

The plate $f^{71}$ as shown is formed with a boss $f^{75}$ formed with an aperture $f^{76}$, in which is arranged the shank of a copper screw $f^{77}$. The head of this screw is provided with a silvered surface $f^{78}$, and is arranged opposite and in the position to be engaged by the silvered surface $f^{67}$ of the shank of the screw $f^{65}$. $f^{79}$ represents a terminal of the primary circuit mounted upon the shank of the screw $f^{77}$ and held in place on said screw by a nut $f^{80}$. $f^{81}$ represents a coil spring arranged on the shank of the screw $f^{77}$ bearing at one end against the terminal $f^{79}$, and the opposite end against a washer $f^{82}$ arranged on the shank of the screw in front of the boss $f^{75}$, see Fig. 20. As shown, the hole through the boss $f^{75}$ is larger than the shank of the screw $f^{77}$, and the sides of the head of the screw $f^{77}$, are mounted fitting into a cup-shaped depression in the boss $f^{75}$. By this construction the head of the screw $f^{77}$ can yield or rock sufficiently to permit a flat and even engagement of the surface $f^{78}$, $f^{67}$ of the contact screw. But for this construction, such contact would be only marginal and further there would be no provisions for compensation for wear.

The arrangement of the parts above described is such that when the heads of the screws $f^{65}$ and $f^{77}$ contact or are in the position shown in Fig. 20, the primary circuit is closed through the primary coils of the transformers, the secondary circuits of the transformers are energized and the welding current flows through the terminals of the transformers and in through the welding electrodes already described. When, however, due to the position of the parts and the softening of the metal the electrodes $f^{26}$ and $f^{44}$ are forced toward each other a predetermined distance, the finger $f^{29}$ engages the head $f^{61}$ of the screw $f^{60}$ forcing down the arm $f^{58}$ and withdrawing the head of the screw $f^{65}$ out of contact with the head of the screw $f^{77}$, thereby breaking the primary circuit, stopping the action of the primary coils, stopping the influence of the primary coils upon the secondary coils of the transformer and thus cutting off the welding current.

Referring to Figs. 6, 11, 22 and 43, the bars of the secondary circuit $h$, $h'$ as shown in Fig. 22 are in contact with the hubs $f^{30}$ extending from the transformers $h^2$, see Fig. 6, the latter in turn being supported by an arm $h^3$ secured to one of the girts $a'$. The transformer may be of any standard or preferred construction, and is shown only diagrammatically in Fig. 6. The transformers are connected to the arms $h^3$ by pins or bolts $h^4$. As the transformer is a well-known instrumentality I have only indicated its general features.

Referring to Fig. 11, $h^5$ represents the core of the transformer. $h^6$ represents the secondary coil ordinarily of a heavy copper casting. In the copper casting or secondary $h^6$, pockets $h^7$ are formed to receive the windings of the primary circuit in the usual way. The energizing of the primary circuit establishes the desired current in the secondary or copper casting $h^6$. The latter current is conducted by means of one bar of the secondary circuit as $h$, see Fig. 22, through the arm $f^{32}$, through the electrode $f^{44}$, through the strand wire $b$, stay wire $b^3$ at their points of contact, through the upper electrode $f^{26}$, through the head $f^{25}$, turning through another upper electrode $f^{26}$, through the work, through the complemental lower electrode $f^{44}$ on the arm $f^{32}$ and the bars $h'$ back to the transformer. It can thus be seen that the bars $h$, $h'$ serve to establish the circuit between the transformer and the arms $f^{32}$ and the parts carried thereby. It can also be seen that the current while it passes through the heads $f^{25}$ from one electrode $f^{26}$ to the other, at this time these parts are electrodes and form a part of the secondary circuit. In this construction all of the devices for controlling the primary circuit are carried by the arms $f^{32}$, or, in other words, by parts mounted on the shaft $c^4$.

As shown in Fig. 11, the transformers are so suspended upon the arms $h^3$ that their bars $h$, $h'$, press upon the hubs $f^{30}$, see Fig. 22, with sufficient pressure to maintain a proper electric contact between said bars and the hub $f^{30}$.

Referring now to the primary circuit, suitable primary wires not shown extend from the terminals $f^{69}$, $f^{79}$, through the holes $f^{37}$ in the sleeve $f^{33}$.

Referring to Figs. 20, 41, 42 and 43, $h^8$ represents a hand switch connected to a suitable primary circuit. $h^9$ represents a primary wire running from one terminal of the switch $h^8$ to the primary wiring in the transformer indicated diagrammatically in Figs. 41 and 42. From the primary winding $h^{10}$ the primary wire $h^9$ is continued to and connected to the end of a brush $h^{11}$, the lower end of which is connected to and insulated from the girt or some stationary part of the machine. From the brush $h^{11}$ the primary current passes through copper blocks $h^{12}$ dove-tailed into the periphery of a fiber disk $h^{13}$ that in turn is mounted upon a sleeve $h^{14}$ fast upon the shaft $c^4$. The sleeve $h^{14}$ is formed with a series of holes as $h^{15}$. From each copper block $h^{12}$ a continuation of the primary wire circuit $h^9$ extends down to the sleeve $h^{14}$ through one of the holes in said sleeve and along said shaft through holes $f^{37}$ in the sleeve $f^{33}$ until it is led out of one of the holes $f^{37}$ to a terminal $f^{79}$.

I have described the primary circuit from the switch to a primary terminal $f^{79}$ for one of the welding units. The same description applies from the blocks $h^{12}$ to any particular terminal $f^{79}$. The copper blocks $h^{12}$ as shown are dove-tailed into the periphery of the disk $h^{13}$ in such a way as to leave an insulated space between each disk greater than the space occupied by the brush so that the latter must be out of contact with one block before it can contact with the succeeding block. The disks $h^{13}$ and their copper blocks $h^{12}$ are positioned on the shaft $c^{14}$ in order to time the contact between the brush $h^{11}$ and any particular block, so that the contact at that point will be made after the cross and strand wires have been gripped by the electrodes and the spring $f^9$, Fig. 20, sufficiently compressed to effect a weld. In other words, this timing of the blocks $h^{12}$ is made with relation to the position of the electrodes $f^{26}$, $f^{44}$.

The copper blocks $h^{12}$ are proportioned with relation to the speed of the disks $h^{13}$ so that each block will contact with the brush $h^{11}$ just after the electrodes $f^{26}$, $f^{44}$ in circuit with that particular block have gripped the wires $b$ and $b^3$ between them and by their movement commence to place the spring $f^9$ under pressure, and said brush and block continuing in contact thereafter until after the period of the normal welding action, or as a matter of position of the electrodes, until they have passed to the point where they are about to separate and a further movement would release the compression in the spring $f^9$, produced by the thrust of the electrodes. In other words, the arc of movement of the disks $h^{13}$ and any particular block $h^{12}$ is timed with relation to the arc of movement of the electrodes, the idea being to have the primary circuit closed by the brush $h^{11}$ soon after the electrodes have reached a point where they have begun to put the spring $f^9$ under additional pressure, and to continue the contact of the brush with the block, until the point is reached in the arc of the travel of the electrodes where they would normally begin to separate. The purpose of this connection is to supply the welding current during the period of a normal weld. The passage of a brush $h^{11}$ away from a particular block $h^{12}$ is not depended upon for breaking the current: the cutting-off of the current is controlled by the movable contact screws $f^{65}$, Fig. 21.

In Fig. 42 I have shown two disks $h^{13}$ on the shaft $c^4$ and two pairs of welding units. In practice there will be a disk $h^{13}$ for each welding unit. The disks, being duplicates of one another, do not require separate description.

Referring to Fig. 20, the primary current from the wire $h^9$ to the terminal $f^{79}$ continues through the contact screws to the terminal $f^{69}$. From this point the primary wire $h^9$ leads to a common return wire $h^{16}$, there being such a common return wire on each pair of flanges $f^{31}$, see Fig. 43. Each return wire $h^{16}$ connects to a main return wire $h^{17}$ that extends lengthwise of the shaft $c^4$ through the holes $f^{37}$ through a hole $h^{18}$ in a bushing of insulating material $h^{19}$ fast on the shaft $c^4$. A copper disk $h^{20}$ is rigidly mounted on the bushing $h^{19}$. The main return wire $h^{17}$ is carried up and by a terminal $h^{21}$ or other desired means connected to the disk $h^{20}$. $h^{22}$ represents a brush, the lower end of which is secured to and insulated from some stationary part of the machine. This brush $h^{22}$ is in contact with the periphery of the copper disk $h^{20}$ at all times. From the brush $h^{22}$ the return wire $h^{17}$ leads to the return pole of the switch $h^8$. By the construction that I have described the disk $h^{20}$ and its connections serve as a common primary return from all the primary break switches.

Referring to Figs. 1, 3, 5, and 26 to 33, after the stay wires $b^3$ are welded to the strand wires $b$ as shown in Fig. 1, the welded fabric passes to a series of wheels $k$ whose hubs are fast on an arbor that in turn is rigidly mounted upon the shaft $c^{10}$. Each of said wheels is formed in the central part of its periphery with a groove $k'$ adapted to receive a strand wire $b$, there being one of said wheels for each strand wire. The periphery of each wheel on each side of said groove $k'$ is formed with companion teeth $k^2$ adapted to engage a stay wire $b^3$ on each side of the strand wire. By means of the wheels $k$, the strand wires are drawn into the machine and the welded fabric drawn away from the welding jaws.

Upon each end of the arbor on the shaft $c^{10}$ is non-rotatively arranged a coiling cam $k^3$, positioned a suitable distance away from the edge of the fabric to permit the location of the coiling mechanism between the cams $k^3$ and the fabric. Each stationary coiling cam $k^3$ is secured by bolts $k^4$ to the free end of a bracket or arm $k^5$ that is adjustably mounted upon the side of the girt $a^4$ by means of clamps $k^6$, enabling the cam $k^3$ to be positioned in the proper location with respect to its associate mechanism hereinafter described (see Fig. 46).

Referring to Fig. 28, each cam $k^6$ is formed on its inner face with a cam groove $k^7$ in which are slidingly arranged cam rolls $k^8$. Each cam roll $k^8$ carries a pintle $k^9$, the free end of which is secured in a sliding block $k^{10}$ arranged to slide radially in suitable guide plates $k^{11}$ projecting from a hub $k^{33}$ fast on the shaft $c^{10}$, adjacent to the hub of the stationary cam ring $k^3$. $k^{12}$ represents a back plate secured to flanges of the guide plate $k^{11}$ by bolts, not shown, the guide plates $k^{11}$ and the back plate $k^{12}$ forming radial guides in which the sliding block $k^{10}$ can be moved by its cam roll $k^8$.

Referring to Figs. 26, 27, 28 and 31, the two outside strand feed wheels $k$ are each formed upon their side next to the cam ring $k^3$ with lugs $k^{13}$. These lugs $k^{13}$ correspond in number to the pairs of teeth $k^2$ and are arranged near the periphery of the wheel $k$ just below the teeth $k^2$, as shown in Fig. 31. Each lug $k^{13}$ is formed with a slot $k^{14}$ and said slot is continued through the rim of the wheel $k$ just in front of each pair of teeth $k^2$. As shown in Figs. 28 and 31, each of these outside strand wire feed wheels $k$ is formed with an additional peripheral groove $k^{15}$ immediately next to the particular tooth $k^2$ that is adjacent the lug $k^{13}$.

$k^{16}$, Figs. 26 and 28, represents a bracket which at its upper end is adjustably secured to the girt $a^4$ by clamp mechanism $k^{17}$. There are two of the brackets $k^{16}$, one for each of the side coiling wheels, see Fig. 3. The free end of each bracket $k^{16}$ projects downward immediately over the space between the teeth $k^2$ of the outside coiling wheels, see Fig. 28.

To the end of each of said brackets is secured a plate $k^{18}$. The lower edge of this bracket is inclined as shown at $k^{19}$, Figs. 26 and 27. The lower portion of the incline $k^{19}$ projects into the groove $k^{15}$. The opposite end of the incline $k^{19}$ is arranged above the path of travel of the stay wires $b^3$ so that as the ends of the stay wires $b^3$ come into the plane of this plate they pass under the upper end of the incline $k^{19}$, and in their further travel are bent down by the incline $k^{19}$ into position shown in dotted lines in Fig. 28. As shown in Fig. 26, the rear end of the incline $k^{19}$ is formed with a flat portion or dwell $k^{20}$ in order to hold the end $b^{40}$ in its depressed bent position shown in Fig. 28 until said end has been positively engaged by a crimping shoe $k^{21}$ arranged to be reciprocated in the slot $k^{14}$ to complete the coiling of the end $b^{40}$ by carrying said end from the middle position shown in Fig. 28 to the final or left-hand position shown in Fig. 28, where it appears coiled around the strand wire $b$ and back against its stay wire $b^3$. The shoe $k^{21}$ is adjustably secured by a bolt $k^{22}$ to the lower end of a lever arm $k^{23}$ connected to a hub $k^{24}$. The lower end of the lever arm $k^{23}$ is formed with a lug $k^{25}$ which is arranged with a set-screw $k^{26}$ adapted to engage a rearward extension of the shoe $k^{21}$ in order to adjust the position of the operating point of the shoe as desired. The hub $k^{24}$ is loosely secured by a cotter pin $k^{27}$ upon a pintle $k^{28}$ arranged in the upper end of an arm $k^{29}$, see Fig. 45. The lower end of this arm is rigidly secured by bolts $k^{30}$ to a pad or a raised portion $k^{31}$ on the side of the wheel $k$.

$k^{32}$, Fig. 28, represents an arm integral with the hub $k^{24}$; the free end of this arm is arranged directly over the sliding block $k^{10}$. $k^{34}$ represents a link pivoted at its lower end to a pintle $k^{35}$ in the upper end of each sliding block $k^{10}$. The upper end of the link $k^{34}$ is tapped to receive the threaded end of an eye-bolt $k^{36}$. $k^{37}$ represents a check nut on the eye-bolt to maintain any particular adjustment of the eye-bolt in the link $k^{34}$. The upper end of the eye-bolt $k^{36}$ is mounted on a pin $k^{38}$ in the free end of the arm $k^{32}$, and held in place by a cotter pin.

There is a cam roll $k^8$ and connected coiling shoe $k^{21}$ for each pair of teeth $k^2$. Due to the rotation of the shaft $c^{10}$, as each end $b^{40}$ of a stay wire is bent down by the plates $k^{18}$ and comes to the dwell $k^{20}$ on said plate, see Fig. 26, it is engaged by a coiling shoe $k^{21}$ and turned to the final position for the coiling shown in Fig. 28.

Referring to Figs. 1, 3, 34 to 36, 47, 48 and 49, after the projecting ends of the stay wires have been coiled by the mechanism carried by shaft $c^{10}$, the fabric then is engaged by mechanism for crimping, so-called, the strand wires.

$m$ represents a cam wheel whose hub is loosely mounted on an arbor on the shaft $c^{14}$. This cam wheel is bolted to and supported directly by brackets $m'$ that at their outer ends are bolted to the frame of the machine, see Fig. 3. The periphery of the wheel $m$ is formed with a cam groove $m^2$ having a throw $m^3$ at one part thereof, see Fig. 49. In the groove $m^2$ is arranged a series of cam rolls $m^4$. $m^5$ represents a pintle arranged in each cam roll. The head $m^6$ of this pintle is formed with two parallel sides $m^7$. $m^8$ represents a screw-threaded lug or extension of the head $m^6$.

Upon the arbor of the shaft $c^{14}$ beyond the cam wheel $m$ is arranged a series of wheels $m^9$ whose hubs $m^{10}$ are rigidly mounted upon the arbor of the shaft $c^{14}$ see Figs. 47 and 48. The peripheries $m^{11}$ of these wheels are either cast or machined to receive the bottoms of U-shaped guide-ways $m^{12}$. Cap screws $m^{13}$ are employed to fasten these guide-ways $m^{12}$ in place on the peripheries $m^{11}$ of the wheels $m^9$. In practice these guide-ways $m^{12}$, in number and arrangement, correspond to the spaces between the stay wires for any particular fabric. In each guide-way $m^{12}$ is arranged a bar $m^{14}$ held in place in the guide-way by bars $m^{15}$ secured by screws $m^{16}$ to the upper edges of the guide-ways $m^{12}$. These bars $m^{14}$ extend from the cam wheel $m$ on one side to a point beyond the fabric on the other side of the machine, see Fig. 3. As shown in Fig. 3, there are a number of bars $m^{15}$ secured to each guide-way $m^{12}$; the number of said bars corresponding to the number of the strand wires. The edge of each of these bars toward the cam wheel $m$ is corrugated or shaped as at $m^{17}$ to correspond to the form in which the crimp in the strand wire is to be made. This edge $m^{17}$ serves as a stationary crimping jaw. Upon the top of each bar $m^{14}$ by screws $m^{18}$ is secured a second crimping bar $m^{19}$ whose edge opposite the edges $m^{17}$ of the bars $m^{15}$ are corrugated as at $m^{20}$ as a complement of the corrugations $m^{17}$; that is, where one of these faces has a depression, the other has a corresponding projection. The bars $m^{19}$ correspond in number to the bars $m^{15}$, and when forced together with their strand wire between them form bends or crimps, so-called. These crimps are indicated in a general way in Fig. 3 at the left of the crimping bars. Each of said bars $m^{14}$ extends over the top of the cam wheel $m$ and is formed with a longitudinal slot $m^{21}$ in which is arranged the head $m^6$ of the pintle $m^5$, see Figs. 34, 35 and 36. A washer $m^{22}$ and a nut $m^{23}$ are employed for securing the head $m^6$ in the slot $m^{21}$. $m^{24}$ represents a plate secured at its ends by screws $m^{25}$ to the end of each bar that is connected to the head $m^6$. $m^{26}$ represents an adjusting screw having a squared end $m^{27}$ for operating the screw having a collar $m^{28}$ integral with the screw, arranged in the recess $m^{29}$ in the end of the bar $m^{14}$. The collar is held in place in said recess by the plate $m^{24}$. The shank of the screw $m^{26}$ is screw-threaded as at $m^{30}$ and arranged in the screw-threaded aperture $m^{31}$ in the head $m^6$. $m^{32}$ represents a reduced and smooth point of the screw $m^{26}$ arranged in a complemental recess in the wall of the slot $m^{21}$. By the described construction the turning of the screw $m^{26}$ will move the bar in or out so that a proper action of the movable crimping bars $m^{19}$ can be had with relation to the stationary crimping bars $m^{15}$.

The parts being arranged as described, the throw $m^3$ of the cam wheel is stopped near the bottom of the wheel, see Fig. 1, so that the strand wires as they come from the parts on the shaft $c^{10}$ can enter a space between a movable crimping jaw and a stationary crimping jaw, thereafter as the parts move from right to left in Fig. 1, the cam throw $m^3$ coöperates to move the crimping bars to crimp the strand wires, thereafter bringing the crimping bars back to their original position in time for the fabric to go forward to the next point.

Referring to Figs. 35 and 48, it will be noticed that the guide-ways $m^{12}$ are arranged in grooves or cut-away portions in the periphery of the wheel $m^9$. The material of the rim of the wheel between the cut-away portions is left intact and forms bearings for the guide-way.

In order to position the strand wires at a proper height to be grasped by the movable and stationary crimping jaws, I groove the edges of the guide-ways $m^{12}$ so that the bars $m^{15}$ will drop into said edges sufficiently to permit the strand wire engaging the uncut part of the guide-ways $m^{12}$ to be engaged squarely by the movable and stationary crimping jaws. Preferably the strand wires should be engaged as near the middle of the jaws as practical considering the thickness of the jaws up and down.

Referring to Fig. 1, after the fabric leaves the crimpers it passes up over an arbor arranged on a shaft $c^{51}$. Upon the arbor of the shaft $c^{21}$ is rigidly mounted a series of feed wheels $o$, the peripheries of which are formed with a central groove and teeth like the wheels $k$, Fig. 32. The wheels $o$ corresponding in number with the strand wires are in a position to receive a strand wire in the grooves of the wheels and to feed the fabric forward by teeth $o'$ of the wheels. $o^2$ represents a ratchet wheel fast on the shaft $c^{21}$. $o^3$ represents a pawl, the rear of which is pivoted to the framework of the machine, while the free end of the pawl runs on the ratchet wheel $o^2$ and by engagement with the teeth thereof, prevents a reverse motion of the shaft $c^{21}$ and the feed wheels $o$. $c^{52}$ represents a tension roll resting on the fabric just in advance of the wheels $o$. This tension roll is supported by arms $c^{53}$ which extend from the rear of the machine beyond the shaft $c^{21}$ where the said arms are formed with a hub $c^{55}$, loosely arranged on a pintle or stud $c^{56}$ carried by a casting $c^{54}$ rigidly mounted upon some part of the framework. Normally the roll $c^{52}$ is held up by the tension of the fabric. The hub $c^{55}$ is formed with a rearward extension or arm $c^{57}$ arranged to be engaged on its under side by an adjusting screw $c^{58}$ to limit the downward motion of the arm $c^{57}$ and the upward motion of the roll $c^{52}$. In the operation of the machine while the fabric is being fed through the machine, the tension of the fabric is sufficient to maintain this roll in its uppermost position. When, however, the feed of the fabric by the wheels $o$ is stopped to permit of the cutting of the fabric farther on, the roll $c^{52}$ drops to take up the slack of the fabric coming forward from the crimpers. As soon as the wheels $o$ are started after the cutting operation the tension of the fabric between the wheels $o$ and the crimpers becomes normal and the roll $c^{52}$ is raised to its uppermost position.

Referring to Fig. 2, in side frames $a^{10}$ are formed ways $a^{11}$ in which the ends of a movable cutter head $a^{12}$ can slide. $a^{13}$ is a steel knife or cutter secured by bolts $a^{14}$ to the lower part of the head $a^{12}$. This head is connected at each side of the machine to an eccentric rod $a^{15}$, each rod being in turn connected to an eccentric strap $a^{16}$ arranged on an eccentric $a^{17}$ that is fast on a shaft $a^{18}$. The eccentric $a^{17}$ fast on the shaft $a^{18}$ is adapted to be driven from the main drive shaft of the machine or any suitable source of power. The shaft $a^{18}$ that is provided with a gear $a^{19}$ is adapted to be driven by a pinion fast on a shaft $a^{20}$ that can be geared up to one of the main shafts of the machine or driven by any suitable source of power. $a^{21}$ represents a clutch lever which when depressed permits the gear $a^{19}$ to drive the shaft $a^{18}$ and the eccentric $a^{17}$ one revolution, bringing the cutter blade $a^{13}$ down through the strand wires $b$ of the fabric severing them across the face of the cutter blade $a^{22}$ secured to the bed of the machine with its edges just below the line of the fabric so as not to interfere with the feed of the fabric. The clutch mechanism controlled by the lever $a^{21}$ may be of any desired form; such mechanism is well known and needs no detailed description as such a clutch mechanism is shown diagrammatically in Fig. 2. The free end of the clutch lever $a^{21}$ is connected to the rear end of a lever $a^{23}$, see Figs. 1 to 4. $a^{23}$ extends toward the forward end of the machine beyond the shaft $c^{21}$ where it is rigidly secured at its end upon a shaft $a^{24}$ that extends crosswise of the machine and is mounted in suitable bearings in standards $a^{25}$ forming a part of the framework or rigidly secured thereto. To the opposite end of the shaft $a^{24}$ is rigidly secured the lower end of a lever $a^{26}$; the upper end of this lever is connected by a rod $a^{27}$ to the lower end of a lever $a^{28}$, which at its upper end is integral with the sleeve $c^{28}$.

Referring to Figs. 1, 3, 37 to 40, $r$ represents a lever, the rear end of which is formed with a hub $r'$ loosely mounted upon a pintle $r^2$ that projects from a hub or casting $r^3$ on the framework. The lever $r$, a short distance to the rear from the hub $r'$, is formed with an overhanging flange $r^4$, in which are arranged adjusting screws $r^5$. $r^6$ represents a shoe formed with two slots. In each of said slots is arranged a cap screw $r^7$ that is screwed into the lever $r$. By means of the adjusting screws $r^5$ and the cap screws $r^7$ the lower face of the shoe $r^6$ can be adjusted up or down as desired. $r^8$ represents a bracket extending out from the side of the framework of the machine below the hub $r'$, see Fig. 3. This bracket at its end is formed with two rearwardly projecting arms $r^9$, $r^{10}$. $r^{11}$ represents a short shaft loosely mounted in bearings in the ends of the arms $r^9$, $r^{10}$, see Fig. 39. Upon the outer end of the shaft $c^{18}$ is secured a disk $a^{29}$ provided with a crank pin $a^{30}$. $a^{31}$ represents a pitman pivoted at one end to the crank pin $a^{30}$, and at its opposite end to a pin $a^{32}$ at the end of an arm $a^{33}$, which at its opposite end is loosely mounted on shaft $r^{11}$. $a^{34}$ represents a pawl pivoted upon the arm $a^{33}$ and provided with a spring $a^{35}$ that normally throws the nose of the pawl into engagement with ratchet teeth $a^{36}$ on a ratchet wheel $a^{37}$ fast on the shaft $r^{11}$. $a^{38}$ represents a pair of duplicate sprocket wheels fast on the shaft $r^{11}$. $a^{39}$ represents a series of pairs of duplicate links. One pair of links is pivoted at its ends to other like links by pins $a^{40}$ to form an endless chain. The number of pairs of links in the chain would depend upon the requirements of any particular fabric. In the form shown there are ten such pairs of links. $a^{41}$ represents a roll mounted upon the pin $a^{40}$, a sleeve being introduced on each side of the rolls to maintain the rolls in central position between the links, see Fig. 38. In the form shown all of the pins $a^{40}$ with one exception are provided with a roll $a^{41}$. In the operation of the machine the sprocket chain described is mounted on the sprocket wheels $a^{38}$; as the latter turns, by reason of the rotation of the shaft $r^{11}$, the rolls $a^{41}$ are brought successively into engagement with the lower face of the shoe $r^6$. When each pin is provided with a roll, a succeeding roll will engage the shoe $r^6$ before a preceding roll has left it, so that the lever $r$ will be maintained in its raised position. When, however, the point in the chain is reached where the pin $a^{40}$ not provided with a roll reaches the shoe $r^6$, the latter and the lever will drop. Due to the actions, the shaft $r^{11}$ and the sprocket wheels $a^{38}$ are intermittently operated.

Referring to Figs. 1, 38 and 40, the shaft $c^{18}$, upon which the cam wheel is mounted that coöperates with the cam shoe $c^{31}$, runs continuously. The action between the shaft $c^{18}$ and the shaft $r^{11}$, Fig. 40, is such that the shaft $r^{11}$ operates intermittently.

The timing of the shafts $r^{11}$ and $c^{18}$ is such that the pin $a^{40}$, whether with or without a roll $a^{41}$, is under the shoe $r^6$ whenever the cam groove of the wheel is in position for the cam shoe $c^{31}$ to enter it. If at this time the roll $a^{41}$ is presented by the pin $a^{40}$ to the cam shoe $r^6$, the lever $r$ will be held up and will in turn hold up the lever $c^{30}$ preventing the shoe $c^{31}$ dropping into the slot in the wheel. If, on the contrary, at such time the pin $a^{40}$ which happens to be under the shoe $r^6$, is not provided with a roll, the shoe and the lever $r$ will drop permitting the lever $c^{30}$ to drop and its cam shoe $c^{31}$ to enter the groove in the cam wheel. The downward movement of the lever $c^{30}$ operates the sleeve $c^{28}$ thereby operating the lever $a^{28}$ and through the connections $a^{27}$, $a^{26}$ and $a^{23}$ releases the clutch lever $a^{21}$ and permits the cutter to operate severing the fabric at that point.

With the sprocket chain to which I have referred, by varying the number of the links or the length of the chain, and the number of rolls and the position of the rolls or space or pins not provided with rolls, the machine is made automatically to determine the point at which the fabric is cut. When the pin $a^{40}$ is not provided with a roll $a^{41}$, it should be provided with a sleeve of sufficient length to maintain the links at the respective ends of the pin.

Referring to Figs. 2 and 4, $t$ represents two standards, the bases of which are secured by bolts $t'$ to the upper edge of the framework of the machine on either side. The upper end of each standard is formed with a hub $t^2$ in which is loosely arranged a shaft $t^3$, held in place by collars $t^4$. $t^5$ represents a series of levers, one for each strand wire, rigidly mounted between their ends upon the shaft $t^3$. The lower end of each lever is provided with a weight as $t^6$ to rest on a strand wire and yieldingly hold it in place against the table while the fabric is being fed forward and more particularly to act as a stop for the free end of the fabric after it has been cut and is being fed forward. The upper ends of the levers $t^5$ are curved as shown and extend up some distance above the plane of the fabric as at $t^7$ in the position shown in Fig. 2. When a cut end of the fabric is fed forward, as it reaches the weights $t^6$ the latter tend to check it and it will bulge up following the curved line of the lever $t^5$ in a general way. As soon as the roll of fabric and its winding roll are removed and a new back winding roll member $c^{50}$ is in position, the shaft $t^3$ is rocked by means of a hand lever $t^8$, permitting the cut end of the fabric to be drawn out and clamped between the rear member $c^{50}$ and the front member $c^{50}$ of the wind-up roll; thereafter the operation of the latter not only taking up the slack but keeping the fabric as taut as desired.

Referring to Fig. 2, $x$ represents an idle roll secured at its ends in brackets $x'$, at the delivery end of the machine below the table over which the fabric passes to the wind-up roll. $x^2$ represents a tension pulley for the belt $c^{39}$. The stud $x^3$ of this pulley is mounted in the end of an arm $x^4$, that is pivoted at $x^5$. $x^6$ is a spring, one end of which is connected to the rear end of the arm $x^4$ and the lower end to a casting or lug $x^7$ on the floor or framework. This spring tends to draw the pulley $x^2$ down against the belt $c^{39}$ and maintain the latter under driving tension. $x^8$ represents a treadle pivoted midway its ends in a bracket $x^9$. This treadle at its rear end is provided with a foot piece $x^{10}$. $x^{11}$ represents a rod connected at its lower end to the front end of the treadle $x^6$ and at its upper end to the arm $x^4$ as shown. $x^{12}$ is a spring catch secured to the framework of the machine below the rear end of the treadle $x^{10}$. This catch is so arranged in relation to the treadle that when the treadle is depressed the catch will snap from the treadle and hold it down until released. By this arrangement the belt $c^{39}$ is kept in driving tension to revolve the fabric roll $b^5$.

When it is desired to remove the wind-up roll the operator by depressing the treadle $X^{10}$ lifts the tension pulley $x^2$ away from the belt $c^{39}$, this action making the belt so loose that it will no longer drive the wind-up roll. After the latter has been removed and a fresh wind-up roll inserted, by releasing the catch $x^{12}$ the tension pulley $x^2$ again engages the belt $c^{39}$ and the latter thereupon begins to drive the wind-up roll.

While some parts of my improved machine are known, many parts are broadly new by themselves and also broadly new in their combination with the old features and I desire to claim said new features and new combinations in the broadest possible legal manner.

While in the particular embodiment of my invention shown and described an induced current is employed for heating the metal to the welding point, my invention is not restricted to the use of such form of current but embraces any form of electric current.

In some of the claims I have employed the term "welding unit" to designate a pair of complemental co-acting welding jaws adapted to make a weld, intending thereby to include not only a pair of welding jaws comprising one jaw on each side of the work, but also a pair or group of jaws on one side of the work complemental to a like number on the opposite side of the work for making a weld or a series of welds simultaneously. While in the drawings the circuits are shown, with particular reference to Fig. 41, as including a break switch, it is manifest that the break switch might be omitted and the make and break of the primary current to stop the welding current for any particular welding unit be controlled solely by the contact of the part $h^{11}$ with a contact member as $h^{12}$ of conducting material, then with the non-conducting material as $h^{13}$.

Having thus explained the nature of my invention and described a way of constructing and using the same, though without attempting to set forth all of the forms in which it may be made, or all of the modes of its use, what I claim and desire to secure by Letters Patent is:—

1. In an electric welding machine, a plurality of pairs of electrically connected rotary welding jaws arranged upon one side of the work, a corresponding number of pairs of independent rotary welding jaws arranged upon the other side of said work, one jaw of each pair of said independent sets being connected to one terminal of the transformer and the other jaw to the opposite terminal, movable supports for one set of said welding jaws, and means for controlling the motion of said supports to vary the path of movement of the jaws carried thereby to correspond to the path of movement of the other companion welding jaws during the welding period.

2. In an electric welding machine, a fabric roll mechanism for the welded fabric, a fabric-cutting device, automatic means for operating the latter to sever predetermined lengths of fabric, and means for controlling the cut end of the fabric until it can be connected with the fabric roll.

3. In an electric welding machine, means for feeding a strand wire, means for feeding a stay wire, a rotary welding jaw arranged upon one side of the said work, a complemental welding jaw arranged on the opposite side of said work, a fabric roll, and means for holding the forward end of the welded fabric until it can be connected to the fabric roll.

4. In an electrical welding machine, two series of rotary welding jaws arranged upon one side of the work electrically connected in pairs, a rotating shaft arranged upon the opposite side of said work, a series of pairs of radial arms carried by said shaft, a welding jaw upon the end of each of said arms complemental to one of the welding jaws of the connected pair, and means for connecting each one of said jaws on each pair of radial arms to an opposite terminal of a transformer.

5. In an electric welding machine, means for feeding strand wires, means for feeding a stay wire, a series of sets of radially arranged pairs of electrically connected, rotary welding jaws upon one side of the work, a complemental series of sets of pairs of radially arranged rotary welding jaws, the jaws of each pair being insulated from each other but each connected to an opposite terminal of a transformer, automatic means for closing the welding circuit through each two complemental pairs of welding jaws to weld a stay wire to the strand wires, and automatic means for opening said welding circuit through said jaws at a predetermined movement of said jaws toward each other.

6. In an electric welding machine, means for welding strand and stay members at points of intersection, automatic means for cutting the fabric into predetermined lengths, comprising a cutter, a measuring device, means controlled by said measuring device for operating the cutter, and a timing device arranged to release the said last-mentioned means to the control of said measuring device.

7. In an electric welding machine, means for feeding strand members, means for feeding stay members, means for welding said members at points of intersection, automatic means for cutting the fabric into predetermined lengths, comprising a cutter, a measuring device, means controlled by said measuring device for operating the cutter, and a timing device arranged to release the said last-mentioned means to the control of said measuring device.

8. In a machine of the class described, means for constructing a fabric, a cutter for said fabric, means arranged for automatically operating said cutter at predetermined intervals representing units of measurement of the fabric, and a separate means automatically acting to interrupt the operation of the first mentioned means except at predetermined times.

9. In an electric welding machine, a pair of welding jaws, a break switch for the welding circuit, comprising two contact members one of which is arranged to be operated by the motion of one of the welding jaws, and means for multiplying the motion given by said jaw to said contact point.

10. In an electric welding machine, a pair of welding jaws, a break switch for the welding current, comprising two contact members one of which is carried by the long arm of a bell-crank lever, the opposite arm of said lever being in position to be engaged by one of the welding jaws at a predetermined time.

11. In an electric welding machine, a rotary welding jaw arranged upon one side of the plane of the work, a complemental rotary welding jaw arranged upon the opposite side of said plane, means for operating said jaws to weld a stay wire to a strand wire during the feeding motion of the strand wire, a fixed crimping jaw arranged upon one side of a strand wire, a movable crimping jaw arranged upon the opposite side of a strand wire, a path cam, and connections between the path cam and the movable jaw whereby the latter may be operated to crimp a strand wire during the feeding motion of the latter.

12. In an electric welding machine, a rotary welding jaw supported upon one side of the plane of the work, a complemental rotary welding jaw supported upon the opposite side of said plane, means for operating said jaws to weld a stay wire to a strand wire during the feeding motion of the strand wire, and means for coiling the projecting end of a stay wire about the strand wire during the feeding motion of the strand wire.

13. In a machine of the class described, means for securing stay wires to strand wires, means engaging the attached stay wires for feeding the fabric, a stationary cam arranged to engage the protruding end of a moving stay wire and bend down the latter, and means for thereafter folding the said bent end of the stay wire inwardly about the strand wire.

14. In a machine of the class described, means for securing stay wires to strand wires, means for feeding the fabric forward, a stationary part arranged to engage the protruding end of a moving stay wire and bend the latter down about the strand wire, a reciprocating shoe timed to thereafter fold the said bent end of the stay wire around the strand wire, and means for operating said shoe.

15. In a machine of the class described, means for securing stay wires to strand wires, means for feeding the fabric forward, a stationary cam arranged to engage the protruding end of a moving stay wire to bend the said end about the strand wire, a reciprocating shoe for thereafter folding the said bent end of the stay wire inwardly about the strand wire, and means including a bell-crank lever and a cam-reciprocated block for operating said shoe.

16. In a machine of the class described, means for welding stay members to strand members, means for cutting the fabric into predetermined lengths comprising a cutter, a lever controlling the operation of the cutter, a rotating timing cam coöperating with said lever to permit the operation of the latter only at a definite point on the cam corresponding to a unit of measurement, and means arranged to engage said lever to prevent its responding to the release of said cam for a predetermined number of said units of measurement or revolutions of the cam.

17. In a machine of the class described, means for welding stay members to strand members, means for cutting the fabric into predetermined lengths comprising a cutter, a lever controlling the operation of the cutter, a rotating timing cam coöperating with said lever to permit the operation of the latter only at a definite point on the cam corresponding to a unit of measurement, and means arranged to engage said lever to prevent its responding to the release of said cam for a predetermined number of units of measurement or revolutions of the cam, said last-mentioned means comprising a series of moving parts arranged to engage said lever in succession whereby the latter can only drop when released by the cam upon the failure of one of said parts to be in an engagement with said lever at that time.

18. In a machine of the class described, means for welding stay members to strand members, means for cutting the fabric into predetermined lengths comprising a cutter, a lever controlling the operation of the cutter, a rotating timing cam coöperating with said lever to permit the operation of the latter only at a definite point on said cam corresponding to a unit of measurement, and means arranged to engage said lever to prevent its responding to the release of said cam for a predetermined number of units of measurement or revolutions of the cam, said last-mentioned means comprising a sprocket wheel timed to rotate with relation to said cam, a sprocket chain arranged on and driven by said wheel, the distance between the pintles of said sprocket chain having the same time relation in travel as the holding face of said cam, while each pintle corresponds in time relation to the release part of said cam, a roll upon a plurality of said pintles, said rolls being arranged to engage said lever in succession to prevent the lever responding to the release part of the cam except when a pintle without a roll comes under the lever so that the lever can only drop to operate the cutter when released by the cam at the time when the pintle without a roll is brought under the lever, whereby a prompt action of the cutter is secured at the end of any selected multiple revolutions of said cam.

19. In an electric welding machine, a welding jaw mounted to rotate upon one side of the plane of the work, a complemental welding jaw mounted to rotate upon the opposite side of the plane of the work, and in a path intersecting the path of its companion jaw, and means for permitting one of said jaws to conform to the path of movement of the other during a predetermined period.

20. In an electric welding machine, a pair of welding jaws arranged to move in continuous paths that normally intersect, means for permitting one of said jaws to conform to the path of movement of the other during a predetermined period, and means to maintain a fixed relation between the jaws and work clamped between the jaws during a predetermined part of said period.

21. In an electric welding machine, a welding jaw carried by a rotating axis upon one side of the plane of the work, a yieldingly-mounted complemental welding jaw carried by a rotating axis upon the opposite side of the plane of the work, arranged as said jaws approach each other to clamp the work between them to cause the yieldingly-mounted jaw to travel in an arc concentric with that of its companion jaw for a predetermined period.

22. In an electric welding machine, a welding jaw carried by a rotating axis upon one side of the plane of the work, a complemental rotating axis upon the opposite side of the plane of the work, a pivoted welding jaw driven by said rotating axis, means for maintaining said pivoted jaw normally positioned to engage a stay wire, and means, when said jaws approach to clamp the work between them to swing and hold the pivoted jaw, to clamp the work against the complemental jaw, for a predetermined period.

23. In an electric welding machine, a welding jaw carried by a rotating axis upon one side of the plane of the work, a complemental pivoted welding jaw driven by a rotating axis upon the opposite side of the plane of the work, means whereby when said jaws come together with the work between them one of said jaws is made to conform to the path of movement of its complemental jaw during a predetermined period, and means for causing the pivoted jaw, as the two jaws approach, to clamp the jaws together with the work between them during a predetermined part of said period.

24. In an electric welding machine, a welding jaw carried by a rotating axis upon one side of the plane of the work, a spring-pressed plunger carried by a rotating axis upon the opposite side of the plane of the work, a welding jaw articulated to said plunger, whereby as said jaws approach each other to clamp the work between them, the pivoted jaw is caused to travel in an arc concentric with that of its companion jaw for a predetermined period with the work clamped between them in a fixed relation.

25. In an electric welding machine, a plurality of welding jaws arranged in sequence to move in a continuous path, a complemental series of welding jaws arranged to move in a path normally intersecting the path of the jaws of the first-mentioned series, means for changing the path of movement of each jaw of one series to conform to the path of its complemental jaw during a predetermined part of said path, and means for welding the parts engaged by said jaws during the period of their movement in complemental paths.

26. In an electric welding machine, a series of welding jaws carried by a rotating axis upon one side of the plane of the work, a complemental series of welding jaws driven by a rotating axis upon the opposite side of the plane of the work, and means, whereby when said jaws approach to clamp the work, the jaws of one set are made to travel in an arc concentric with that of their complemental jaws during a predetermined period.

27. In an electric welding machine, a plurality of welding jaws arranged in sequence to travel in a continuous path on one side of the plane of the work, a complemental series of welding jaws arranged to travel in a continuous path on the opposite side of the plane of the work, and means whereby a jaw of one set is made to travel in a path corresponding to that of its complemental jaw of the other set during a predetermined period.

28. In an electric welding machine, a pair of welding jaws arranged side by side and electrically connected by a bridge piece and adapted to travel with the work, a complemental pair of welding jaws arranged on the opposite side of the work, each being connected to a source of power and adapted to travel with the work, and means for causing the second pair of jaws to co-act with the first pair to weld a stay wire to two strand wires.

29. In an electric welding machine, a pair of sets of welding jaws arranged side by side to move about an axis in continuous paths, upon one side of the plane of the work, each set of said pair comprising a series of jaws arranged in sequence, the jaw of each set being electrically connected to its lateral companion jaw, a complemental pair of sets of welding jaws arranged side by side to move about a fixed axis upon the opposite side of the plane of the work, and in a path normally intersecting the path of the jaws of the first-mentioned pair, each set of the second pair comprising a series of jaws arranged in sequence, insulated from each other but connected to a source of power, each jaw in one set with its companion lateral jaw in the other set coacting with a complemental pair of jaws on the opposite side of the work, automatic means whereby each pair of jaws of one set is made to travel in a path corresponding to the path of its complemental pair of jaws in the other set during a predetermined period, and means whereby each two pairs of complemental jaws weld a stay wire to two strand wires during the period of the travel of the jaws in the complemental paths.

30. In an electric welding machine, a pair of sets of welding jaws arranged to move about an axis in continuous paths, each set comprising a series of jaws arranged in sequence, each jaw of one set being oppositely disposed to a jaw of the other set, constituting a pair, a bridge piece connecting each pair of jaws, a rotating axis upon the opposite side of the plane of the work, a pair of hubs of conducting material fixed on said axis to rotate therewith but insulated therefrom and from each other, means for electrically connecting each hub to an appropriate terminal of a transformer, each hub being formed with a plurality of radial arms corresponding to the number of jaws of each set of the first-mentioned series, each arm of each hub being oppositely disposed to an arm on the companion hub and constituting a pair, a welding jaw electrically connected to each arm, a break switch carried by one arm of each pair of hubs and adapted to be operated upon the softening of the metal to break the circuit, movable supports for one set of said welding jaws, to vary the path of movement of the jaws carried thereby to correspond to the path of movement of the companion jaws during the welding period.

31. In an electric welding machine, a plurality of sets of welding jaws arranged to move about an axis in continuous paths, each set comprising a series of jaws arranged in sequence, a complemental plurality of sets of welding jaws arranged to move about a second axis and in a path normally intersecting the path of the jaws of the first-mentioned sets, automatic means whereby each jaw of the second set is made to travel in a path conforming to the path of its complemental jaw of the first-mentioned set during a predetermined period, and means whereby the complemental jaws weld a stay wire to strand wires during the period of the travel of the jaws in the complemental paths.

32. In a electric welding machine, means for feeding a strand wire, a welding jaw arranged upon one side of the plane of the work, a complemental welding jaw arranged upon the opposite side of the plane of the work, a stay wire magazine provided with an elongated throat to hold a series of stay wires one on the other with the lowest stay wire resting on a strand wire, means for removing the last-named stay wire in position to be gripped by the welding jaws without interfering with the superimposed stay wires, and means for operating said jaws to electrically weld the said stay wire to the strand wire.

33. In an electric welding machine, a welding jaw arranged upon one side of the plane of the work, a spring-pressed plunger arranged upon the opposite side of the plane of the work, a support for said plunger, a welding jaw pivoted to said plunger and formed with a part extending rearwardly from the pivot of the jaw, a pin one end of which rests upon said part with the opposite end loosely positioned in a complemental aperture in the plunger support, a helical spring arranged on said pin between said support and said part and tending normally to yieldingly swing said jaw away from the work, means as said jaws approach to engage the work to swing the jaw with the work against the tension of said spring toward its companion jaw, and means for electrically welding the work comprising a break switch mounted upon some support on the opposite side of the work from the pivoted jaw and arranged to be tripped by the pivoted jaw upon the softening of the metal.

34. In an electric welding machine, a welding jaw arranged upon one side of the plane of the work, a spring-pressed plunger arranged upon the opposite side of the plane of the work, a support for said plunger, a welding jaw pivoted to said plunger, yielding means for normally holding said jaw open, and means for engaging said jaw to clamp the work between said jaw and its companion jaw, and means actuated by the pivoted jaw for interrupting the welding action.

35. In an electric welding machine, a plurality of welding units, a transformer, connections between each unit and the secondary circuit of said transformer, a rotating disk of insulating material, a series of contact members carried by said disk and insulated from one another, connections between the primary circuit and said contact members including a part to be engaged by said members in sequence as the disk rotates, a second rotating member of conducting material insulated from its support, connections between said last-named member and the primary circuit, and connections between said last-named member and each of the contact members on the rotating disk comprising a series of break switches corresponding in number to the number of said contact members and to the welding units, and means whereby upon the softening of the metal held by a welding unit, the complemental break switch of that unit will be operated to break the primary current.

36. In an electric welding machine, a plurality of welding units, a transformer, connections between each welding unit and the secondary circuit of said transformer, a rotating member of insulating material, a series of contact members of conducting material carried by said member in series but insulated from one another, connections between the primary circuit of said transformer and said contact members including a part adapted to engage the said contact members one after the other in series and to contact with the insulating material between each of said members, said members corresponding in number to the number of welding units, a rotating member of conducting material insulated from its support, connections between said member and the primary circuit of the transformer, connections between said member and each of the contact members on said disk, and means for operating said welding units serially to correspond with the engagement of a particular contact member with the part connected to the primary circuit whereby the welding current is applied to said welding units in series.

37. In an electric welding machine, means for feeding strand wires, means for feeding stay wires, means for welding said wires at their points of intersection, means for cutting the completed fabric into predetermined lengths, and means interposed between the welding means and the cutting means for taking up the slack of the finished fabric during the cutting operation.

38. In an electric welding machine, a hub of conducting material mounted upon and insulated from a rotating shaft, a welding jaw connected to said hub, a complemental opposed welding jaw, a source of electricity, connections between the last-mentioned jaw and said source of electricity, connections between said source of electricity and said hub comprising a bar of conducting material adapted for rubbing contact upon a complemental face of said rub, and means for operating said jaws to hold the work during the welding operation.

39. In an electric welding machine, a pair of welding jaws arranged upon one side of the plane of the work, and electrically connected, a pair of hubs of conducting material mounted upon a rotating shaft but insulated therefrom and from each other, complemental welding jaws carried by each hub, a source of electricity, means for connecting said source with one of said hubs, an electrical connection between said source of electricity and the second hub, and means for operating said jaws to hold the work during the welding operation.

In testimony whereof I have affixed my signature.

WILLIAM S. SOUTHWICK.